US011902881B2

(12) United States Patent
Martin et al.

(10) Patent No.: US 11,902,881 B2
(45) Date of Patent: *Feb. 13, 2024

(54) TELECOMMUNICATIONS APPARATUS AND METHODS

(71) Applicant: Sony Group Corporation, Tokyo (JP)

(72) Inventors: Brian Alexander Martin, Surrey (GB); Matthew William Webb, Surrey (GB)

(73) Assignee: SONY GROUP CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/878,107

(22) Filed: Aug. 1, 2022

(65) Prior Publication Data

US 2022/0369208 A1 Nov. 17, 2022

Related U.S. Application Data

(63) Continuation of application No. 17/176,148, filed on Feb. 15, 2021, now Pat. No. 11,405,855, which is a
(Continued)

(30) Foreign Application Priority Data

Sep. 25, 2013 (EP) .................................... 13185929

(51) Int. Cl.
H04W 48/10 (2009.01)
H04W 48/16 (2009.01)
(Continued)

(52) U.S. Cl.
CPC ........... *H04W 48/10* (2013.01); *H04L 5/0007* (2013.01); *H04W 4/70* (2018.02); *H04W 48/16* (2013.01);
(Continued)

(58) Field of Classification Search
CPC ....... H04W 48/10; H04W 48/16; H04W 4/70; H04W 72/005; H04W 4/06; H04L 5/0007; H04L 5/003; H04L 5/0094
See application file for complete search history.

(56) References Cited

U.S. PATENT DOCUMENTS 8,599,802 B2 * 12/2013 Sammour ........... H04L 12/1895
370/312
8,897,838 B2 * 11/2014 Sharma ................. H04W 24/02
370/312
(Continued)

FOREIGN PATENT DOCUMENTS

GB 2487757 A 8/2012
GB 2487780 A 8/2012
(Continued)

OTHER PUBLICATIONS

ETSI TS 125 331 V11.6.0 (Jul. 2013),"Universal Mobile Telecommunications System (UMTS); Radio Resource Control (RRC); Protocol specification (3GPP TS 25.331 version 11.6.0 Release 11)" (Year: 2013).
(Continued)

Primary Examiner — Parth Patel
(74) Attorney, Agent, or Firm — XSENSUS LLP

(57) ABSTRACT

The system supports a virtual carrier mode of operation in which downlink communications are made by a base station using a radio interface that spans a system frequency bandwidth while a terminal device is configured to receive at least some communications from the base station within a restricted subset of transmission resources selected from within the system frequency bandwidth. The system supports terminal devices in both a radio resource control connected mode and a radio resource control idle mode. When there is to be a change in system information the base station transmits to the terminal device an indication that
(Continued)

updated system information is to be broadcast by the base station and this indication is received by the terminal device while in the connected mode. Before seeking to acquire the updated system information, the terminal device transitions from the connected mode to the idle mode.

17 Claims, 6 Drawing Sheets

Related U.S. Application Data continuation of application No. 16/157,976, filed on Oct. 11, 2018, now Pat. No. 10,924,981, which is a continuation of application No. 14/916,117, filed as application No. PCT/EP2014/063526 on Jun. 26, 2014, now Pat. No. 10,136,381.

(51) Int. Cl.
  *H04W 4/70* (2018.01)
  *H04W 72/30* (2023.01)
  *H04L 5/00* (2006.01)
  *H04W 4/06* (2009.01)
  *H04W 76/27* (2018.01)

(52) U.S. Cl.
  CPC .......... *H04W 72/30* (2023.01); *H04L 5/003* (2013.01); *H04L 5/0094* (2013.01); *H04W 4/06* (2013.01); *H04W 76/27* (2018.02)

(56) References Cited

U.S. PATENT DOCUMENTS

| | | | |
|---|---|---|---|
| 9,119,096 B2 | 8/2015 | Yi et al. | |
| 10,136,381 B2* | 11/2018 | Martin | H04W 48/10 |
| 2008/0056190 A1* | 3/2008 | Kim | H04W 36/0077 370/331 |
| 2008/0146228 A1* | 6/2008 | Kim | H04W 36/0066 455/436 |
| 2009/0318170 A1* | 12/2009 | Lee | H04W 68/02 455/458 |
| 2010/0093350 A1* | 4/2010 | Wang | H04J 11/0086 455/436 |
| 2010/0130218 A1* | 5/2010 | Zhang | H04W 48/12 455/458 |
| 2010/0195621 A1* | 8/2010 | Kekki | H04W 48/17 370/332 |
| 2010/0272017 A1* | 10/2010 | Terry | H04W 48/12 370/328 |
| 2011/0002250 A1* | 1/2011 | Wang | H04W 76/40 340/539.22 |
| 2011/0086608 A1* | 4/2011 | Yamagishi | H04W 48/12 455/404.1 |
| 2011/0171929 A1* | 7/2011 | Tamura | H04W 48/12 455/404.1 |
| 2011/0183661 A1* | 7/2011 | Yi | H04W 24/10 455/422.1 |
| 2011/0190011 A1* | 8/2011 | Choi | H04L 5/003 455/466 |
| 2011/0230220 A1* | 9/2011 | Chen | H04W 76/34 455/507 |
| 2011/0305183 A1* | 12/2011 | Hsu | H04W 36/0007 370/312 |
| 2012/0039171 A1* | 2/2012 | Yamada | H04L 47/24 370/232 |
| 2012/0115471 A1* | 5/2012 | Awoniyi | H04W 52/0206 455/435.1 |
| 2012/0202493 A1* | 8/2012 | Wang | H04W 60/00 455/435.1 |
| 2012/0207070 A1* | 8/2012 | Xu | H04W 48/20 370/311 |
| 2012/0269162 A1* | 10/2012 | Vesterinen | H04W 8/082 370/331 |
| 2012/0322386 A1* | 12/2012 | Yi | H04W 24/08 455/67.11 |
| 2012/0327895 A1* | 12/2012 | Wallen | H04W 48/12 370/329 |
| 2013/0028165 A1* | 1/2013 | Kim | H04W 72/30 370/312 |
| 2013/0034080 A1* | 2/2013 | Yang | H04W 36/0009 370/331 |
| 2013/0053035 A1* | 2/2013 | Johansson | H04W 48/16 455/436 |
| 2013/0058234 A1* | 3/2013 | Yang | H04W 36/0094 370/252 |
| 2013/0065585 A1* | 3/2013 | Pelletier | H04W 4/023 455/456.6 |
| 2013/0107784 A1* | 5/2013 | Chang | H04W 72/30 370/312 |
| 2013/0121225 A1* | 5/2013 | Ryu | H04W 52/0229 370/311 |
| 2013/0258938 A1* | 10/2013 | Sagfors | H04W 72/02 370/312 |
| 2013/0272148 A1* | 10/2013 | Fong | H04W 76/10 370/312 |
| 2013/0303203 A1* | 11/2013 | Wang | H04W 68/00 455/458 |
| 2013/0337799 A1* | 12/2013 | Ekici | H04W 48/20 455/423 |
| 2014/0011519 A1* | 1/2014 | Lee | H04W 8/24 455/456.1 |
| 2014/0036812 A1* | 2/2014 | Malladi | H04W 36/38 370/329 |
| 2014/0094212 A1* | 4/2014 | Ahn | H04W 4/70 455/517 |
| 2014/0134970 A1* | 5/2014 | Pazos | H04W 4/90 455/404.1 |
| 2014/0148168 A1* | 5/2014 | Aoyagi | H04W 48/12 455/436 |
| 2014/0199979 A1* | 7/2014 | Singhai | H04W 52/0216 455/418 |
| 2014/0287694 A1* | 9/2014 | Kim | H04W 16/18 455/67.11 |
| 2014/0287753 A1* | 9/2014 | Schulist | H04W 48/18 455/436 |
| 2014/0302856 A1* | 10/2014 | Nory | H04W 68/02 455/437 |
| 2014/0307698 A1* | 10/2014 | Beale | H04W 72/23 370/329 |
| 2014/0362752 A1* | 12/2014 | Jha | H04W 72/30 370/311 |
| 2015/0038142 A1* | 2/2015 | Wang | H04W 48/12 455/436 |
| 2015/0043448 A1* | 2/2015 | Chatterjee | H04W 76/14 370/329 |
| 2015/0044984 A1 | 2/2015 | Sammour et al. | |
| 2015/0208379 A1* | 7/2015 | Lin | H04W 72/30 370/312 |
| 2016/0007406 A1* | 1/2016 | Yi | H04W 24/02 370/252 |
| 2016/0219475 A1* | 7/2016 | Kim | H04W 76/15 |
| 2016/0219495 A1* | 7/2016 | Martin | H04L 5/0007 |
| 2017/0150428 A1 | 5/2017 | Nory et al. | |
| 2017/0156091 A1 | 6/2017 | Wang et al. | |
| 2017/0164419 A1 | 6/2017 | Kim | |
| 2019/0045425 A1* | 2/2019 | Martin | H04W 48/10 |
| 2022/0369208 A1* | 11/2022 | Martin | H04L 5/0007 |

FOREIGN PATENT DOCUMENTS

| | | |
|---|---|---|
| GB | 2487782 A | 8/2012 |
| GB | 2487906 A | 8/2012 |
| GB | 2487907 A | 8/2012 |
| GB | 2487908 A | 8/2012 |
| GB | 2487909 A | 8/2012 |

(56) References Cited

FOREIGN PATENT DOCUMENTS

| GB | 2488513 A | 9/2012 |
| GB | 2497742 A | 6/2013 |
| GB | 2497743 A | 6/2013 |

OTHER PUBLICATIONS

LTE; Evolved Universal Terrestrial Radio Access (E-UTRA); Radio Resource Control (RRC); Protocol Specification 3GPP Ts 36.331 version 11.4.0 Release 11), ETSI TS 136 331 V11.4.0, Jul. 2013, pp. 1-350.

Chinese Office Action and Search Report dated Sep. 8, 2018 in Chinese Application No. 2014800528326.

"Technical Specification Group Radio Access Network; Radion Resource Control (RRC); Protocol Specification (Release 8)", 3GPP TS 25.331 V8.23.0 (Jun. 2013).

LG Electronics Inc., "The Criteria for System Information Acquisition", 3GPP TSG-RAN WG2 RRC Adhoc , Sophia, Antipolis, France, R2-082974, Jun. 5-6, 2008, pp. 1-2.

"Digital Cellular Telecommunications System (Phase 2+); Universal Mobile Telecommunications System (UMTS); LTE; Service Requirements for Machine-Type Communications (MTC); Stage 1 (3GPP TS 22.368 version 11.6.0 Release 11)", ETSI TS 122 368 V11.6.0, Sep. 2012, pp. 1-21.

Holma et al. "LTE for UMTS OFDMA and SC-FDMA based radio access", John Wiley and Sons, 2009, pp. 4.

International Search Report dated Oct. 10, 2014 in PCT/EP2014/063526.

* cited by examiner

TELECOMMUNICATIONS APPARATUS AND METHODS

CROSS-REFERENCE TO RELATED APPLICATIONS

This application is a continuation of U.S. application Ser. No. 17/176,148, filed Feb. 15, 2021, which is a continuation of Ser. No. 16/157,976, filed Oct. 11, 2018 (now U.S. Pat. No. 10,924,981), which is a continuation of Ser. No. 14/916, 117, filed Mar. 2, 2016 (now U.S. Pat. No. 10,136,381), which is a National Stage Entry of International Patent Application No. PCT/EP2014/063526, filed Jun. 26, 2014, and claims priority to European Patent Application 13185929.0, filed Sep. 25, 2013, the entire contents of each of which being incorporated herein by reference.

BACKGROUND

Field

The present disclosure relates to telecommunications apparatus and methods.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

The present disclosure relates to wireless telecommunications systems and methods, and in particular to systems and methods for restricted frequency resource/virtual carrier operation in wireless telecommunication systems.

Mobile communication systems have evolved over the past ten years or so from the GSM System (Global System for Mobile communications) to the 3G system and now include packet data communications as well as circuit switched communications. The third generation partnership project (3GPP) is developing a fourth generation mobile communication system referred to as Long Term Evolution (LTE) in which a core network part has been evolved to form a more simplified architecture based on a merging of components of earlier mobile radio network architectures and a radio access interface which is based on Orthogonal Frequency Division Multiplexing (OFDM) on the downlink and Single Carrier Frequency Division Multiple Access (SC-FDMA) on the uplink.

Third and fourth generation mobile telecommunication systems, such as those based on the 3GPP defined UMTS and Long Term Evolution (LTE) architectures, are able to support a more sophisticated range of services than simple voice and messaging services offered by previous generations of mobile telecommunication systems.

For example, with the improved radio interface and enhanced data rates provided by LTE systems, a user is able to enjoy high data rate applications such as mobile video streaming and mobile video conferencing that would previously only have been available via a fixed line data connection. The demand to deploy third and fourth generation networks is therefore strong and the coverage area of these networks, i.e. geographic locations where access to the networks is possible, is expected to increase rapidly.

The anticipated widespread deployment of third and fourth generation networks has led to the parallel development of a class of devices and applications which, rather than taking advantage of the high data rates available, instead take advantage of the robust radio interface and increasing ubiquity of the coverage area. Examples include so-called machine type communication (MTC) applications, some of which are in some respects typified by semi-autonomous or autonomous wireless communication devices (MTC devices) communicating small amounts of data on a relatively infrequent basis. Examples include so-called smart meters which, for example, are located in a customer's home and periodically transmit data back to a central MTC server relating to the customer's consumption of a utility such as gas, water, electricity and so on. Smart metering is merely one example of potential MTC device applications. Further information on characteristics of MTC-type devices can be found, for example, in the corresponding standards, such as ETSI TS 122 368 V11.6.0 (2012-09)/ 3GPP TS 22.368 version 11.6.0 Release 11) [1].

Whilst it can be convenient for a terminal such as an MTC-type terminal to take advantage of the wide coverage area provided by a third or fourth generation mobile telecommunication network there are at present disadvantages. Unlike a conventional third or fourth generation mobile terminal such as a smartphone, a primary driver for MTC-type terminals will be a desire for such terminals to be relatively simple and inexpensive. The type of functions typically performed by an MTC-type terminal (e.g. simple collection and reporting/reception of relatively small amounts of data) do not require particularly complex processing to perform, for example, compared to a smartphone supporting video streaming. However, third and fourth generation mobile telecommunication networks typically employ advanced data modulation techniques and support wide bandwidth usage on the radio interface which can require more complex and expensive radio transceivers and decoders to implement. It is usually justified to include such complex elements in a smartphone as a smartphone will typically require a powerful processor to perform typical smartphone type functions. However, as indicated above, there is now a desire to use relatively inexpensive and less complex devices which are nonetheless able to communicate using LTE-type networks.

With this in mind there has been proposed a concept of so-called "virtual carriers" operating within the bandwidth of a "host carrier", for example, as described in GB 2 487 906 [2], GB 2 487 908 [3], GB 2 487 780 [4], GB 2 488 513 [5], GB 2 487 757 [6], GB 2 487 909 [7], GB 2 487 907 [8] and GB 2 487 782 [9]. One principle underlying the concept of a virtual carrier is that a frequency subregion (subset of frequency resources) within a wider bandwidth (greater range of frequency resources) host carrier is configured for use as a self-contained carrier for at least some types of communications with certain types of terminal device.

In some implementations, such as described in references [2] to [9], all downlink control signalling and user-plane data for terminal devices using the virtual carrier are conveyed within the subset of frequency resources associated with the virtual carrier. A terminal device operating on the virtual carrier is made aware of the restricted frequency resources and need only receive and decode a corresponding subset of transmission resources to receive data from the base station. An advantage of this approach is to provide a carrier for use by low-capability terminal devices capable of operating over only relatively narrow bandwidths. This allows devices to communicate on LTE-type networks, without requiring the devices to support full bandwidth operation. By reducing the bandwidth of the signal that needs to be decoded, the front end processing requirements (e.g., FFT, channel estimation, subframe buffering etc.) of a device configured to operate on a virtual carrier are reduced since the complexity of these functions is generally related to the bandwidth of the signal received.

Other virtual carrier approaches for reducing the required complexity of devices configured to communicate over LTE-type networks are proposed in GB 2 497 743 [10] and GB 2 497 742 [11]. These documents propose schemes for communicating data between a base station and a reduced-capability terminal device whereby physical-layer control information for the reduced-capability terminal device is transmitted from the base station using subcarriers selected from across a full host carrier frequency band (as for conventional LTE terminal devices). However, higher-layer data for reduced-capability terminal devices (e.g. user-plane data) is transmitted using only subcarriers selected from within a restricted subset of carriers which is smaller than and within the set of subcarriers comprising the system frequency band. Thus, this is an approach in which user-plane data for a particular terminal device may be restricted to a subset of frequency resources (i.e. a virtual carrier supported within the transmission resources of a host carrier), whereas control signalling is communicated using the full bandwidth of the host carrier. The terminal device is made aware of the restricted frequency resource, and as such need only buffer and process data within this frequency resource during periods when higher-layer data is being transmitted. The terminal device buffers and processes the full system frequency band during periods when physical-layer control information is being transmitted. Thus, the reduced-capability terminal device may be incorporated in a network in which physical-layer control information is transmitted over a wide frequency range, but only needs to have sufficient memory and processing capacity to process a smaller range of frequency resources for the higher-layer data. This approach may sometimes be referred to as a "T-shaped" allocation because the area of the downlink time-frequency resource grid to be used by the reduced-capability terminal device may in some cases comprise a generally T-shape.

Virtual carrier concepts thus allow terminal devices having reduced capabilities, for example in terms of their transceiver bandwidth and/or processing power, to be supported within LTE-type networks. As noted above, this can be useful for to allow relatively inexpensive and low complexity devices to communicate using LTE-type networks. However, providing support for reduced capability devices in a wireless telecommunications system which is generally based around existing standards can require additional considerations for some operational aspects of wireless telecommunications systems to allow the reduced capability terminal devices to operate in conjunction with conventional terminal devices.

One area where the inventors have recognised a need for new procedures concerns the acquisition of system information, and in particular where there has been a change in system information. In broad summary, system information, or at least some aspects of system information, in existing wireless telecommunications systems, such as LTE-based telecommunications systems, is transmitted for all terminal devices in a broadcast manner. A reduced capability device that is required to obtain new system information must receive and decode these broadcasts. The need to acquire system information impacts the ability of the reduced capability terminal device to receive dedicated transmissions during the period it is acquiring new system information and consequently impacts the way in which transmissions can be scheduled for reduced capability terminal devices.

There is therefore a need for schemes which allow system information to be communicated to terminal devices operating on restricted downlink frequency resources in wireless telecommunications systems in a manner which can help reduce the impact of acquiring system information on other operational aspects of the system.

SUMMARY

According to a first aspect of the present disclosure, there is provided a method of operating a terminal device in a wireless telecommunications system in which downlink communications are made by a base station using a radio interface that spans a system frequency bandwidth and the terminal device is configured to receive at least some communications from the base station within a restricted subset of transmission resources selected from within the system frequency bandwidth and comprising a downlink channel having a channel bandwidth which is smaller than the system frequency bandwidth, and wherein the wireless telecommunications system supports a connected mode of operation in which the terminal device receives a type of user-plane data using the restricted subset of transmission resources and an idle mode of operation in which terminal device does not receive the type of user-plane data, the method comprising: receiving from the base station an indication that updated system information is to be broadcast by the base station, wherein the indication is received while the terminal device is in the connected mode; transitioning from the connected mode to the idle mode before seeking to acquire the updated system information; and seeking to acquire the updated system information broadcast by the base station while the terminal device is in the idle mode.

According to a second aspect of the present disclosure, there is provided a terminal device for use in a wireless telecommunications system in which downlink communications are made by a base station using a radio interface that spans a system frequency bandwidth and the terminal device is configured to receive at least some communications from the base station within a restricted subset of transmission resources selected from within the system frequency bandwidth and comprising a downlink channel having a channel bandwidth which is smaller than the system frequency bandwidth, and wherein the wireless telecommunications system supports a connected mode of operation in which the terminal device receives a type of user-plane data using the restricted subset of transmission resources and an idle mode of operation in which terminal device does not receive the type of user-plane data, wherein the terminal device comprises: a transceiver unit configured to receive from the base station an indication that updated system information is to be broadcast by the base station while the terminal device is in the connected mode; and a controller unit configured to cause the terminal device to transition from the connected mode to the idle mode before seeking to acquire the updated system information and to seek to acquire the updated system information broadcast by the base station while the terminal device is in the idle mode.

According to a third aspect of the present disclosure, there is provided a method of operating a base station in a wireless telecommunications system in which downlink communications are made by the base station using a radio interface that spans a system frequency bandwidth and the base station is configured to transmit at least some communications to at least one terminal device within a restricted subset of transmission resources selected from within the system frequency bandwidth and comprising a downlink channel having a channel bandwidth which is smaller than the system frequency bandwidth, and wherein the wireless telecommunications system supports the terminal device in a connected mode of operation in which the base station transmits a type of user-plane data to the terminal device using the restricted subset of transmission resources and an idle mode of operation in which the base station does not transmit the type of user-plane data to the terminal device, the method comprising: transmitting an indication that updated system information is to be broadcast by the base station, wherein the indication is transmitted while the terminal device is in the connected mode; and restricting the scheduling of user-plane data transmissions for the terminal device from a first time point after the transmission of the indication that updated system information is to be broadcast to a second time point after the terminal device re-enters the connected mode after having transitioned to the idle mode following the transmission of the indication that updated system information is to be broadcast.

According to a fourth aspect of the present disclosure, there is provided a base station for use in a wireless telecommunications system in which downlink communications are made by the base station using a radio interface that spans a system frequency bandwidth and the base station is configured to transmit at least some communications to at least one terminal device within a restricted subset of transmission resources selected from within the system frequency bandwidth and comprising a downlink channel having a channel bandwidth which is smaller than the system frequency bandwidth, and wherein the wireless telecommunications system supports the terminal device in a connected mode of operation in which the base station transmits a type of user-plane data to the terminal device using the restricted subset of transmission resources and an idle mode of operation in which the base station does not transmit the type of user-plane data to the terminal device, wherein the base station comprises: a transceiver unit configured to transmit an indication that updated system information is to be broadcast by the base station while the terminal device is in the connected mode; and a controller unit configured to restrict the scheduling of user-plane data transmissions for the terminal device from a time associated with the broadcast of the updated system information until after the terminal device re-enters the connected mode after having transitioned to the idle mode following the transmission of the indication that updated system information is to be broadcast.

Further respective aspects and features are defined by the appended claims.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings wherein like reference numerals designate identical or corresponding parts throughout the several views, and wherein.

DETAILED DESCRIPTION OF THE EMBODIMENTS

Figure 1:
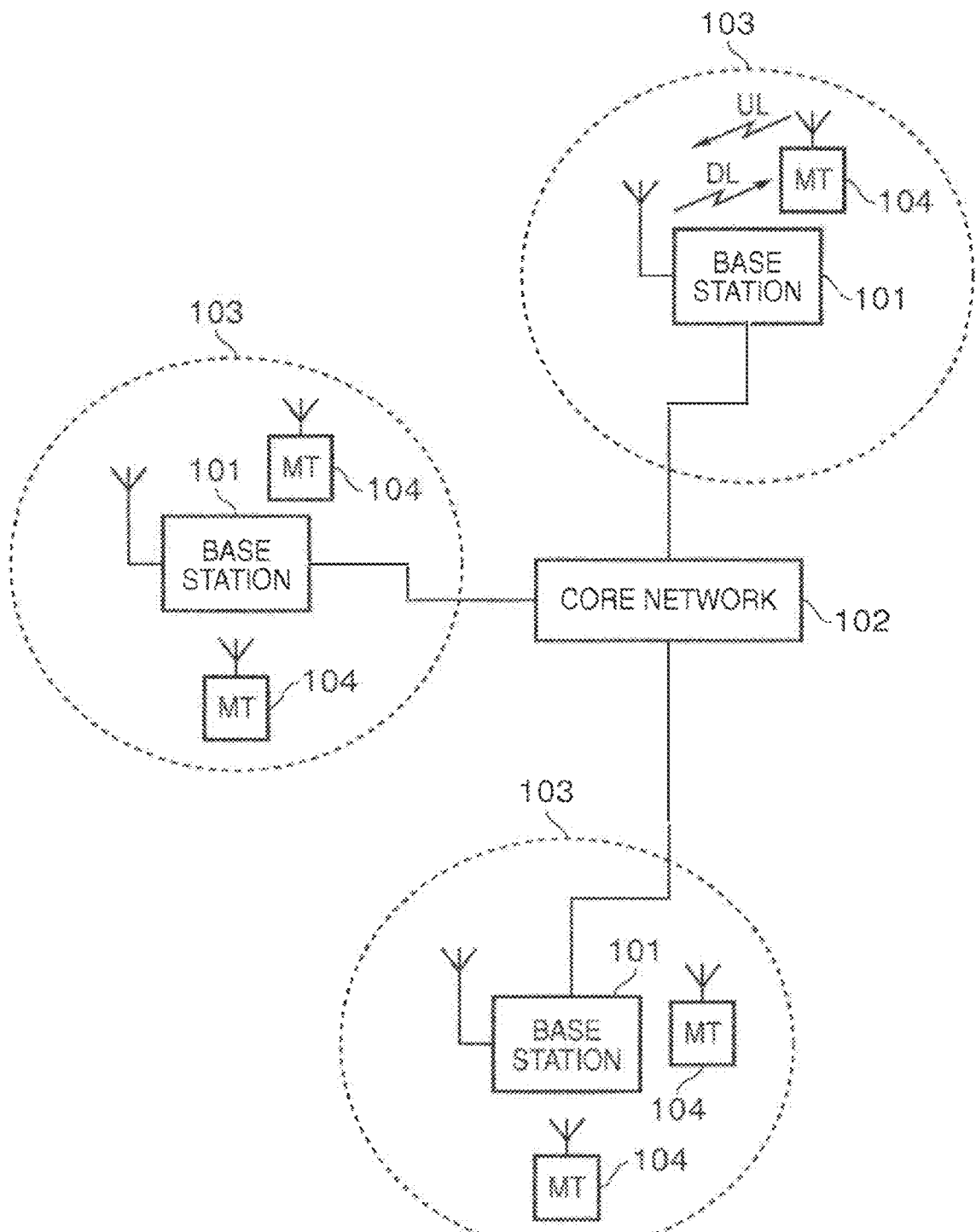
FIG. 1 schematically represents an example of a LTE-type wireless telecommunication network.

FIG. 1 provides a schematic diagram illustrating some basic functionality of a wireless telecommunications network/system 100 operating in accordance with LTE principles. Various elements of FIG. 1 and their respective modes of operation are well-known and defined in the relevant standards administered by the 3GPP (RTM) body and also described in many books on the subject, for example, Holma, H. and Toskala, A. [12].

The network 100 includes a plurality of base stations 101 connected to a core network 102. Each base station provides a coverage area 103 (i.e. a cell) within which data can be communicated to and from terminal devices 104. Data are transmitted from base stations 101 to terminal devices 104 within their respective coverage areas 103 via a radio downlink. Data are transmitted from terminal devices 104 to the base stations 101 via a radio uplink. The core network 102 routes data to and from the terminal devices 104 via the respective base stations 101 and provides functions such as authentication, mobility management, charging and so on. Terminal devices may also be referred to as mobile stations, user equipment (UE), user terminal, mobile radio, and so forth. Base stations may also be referred to as transceiver stations/nodeBs/e-NodeBs, and so forth.

Figure 2:
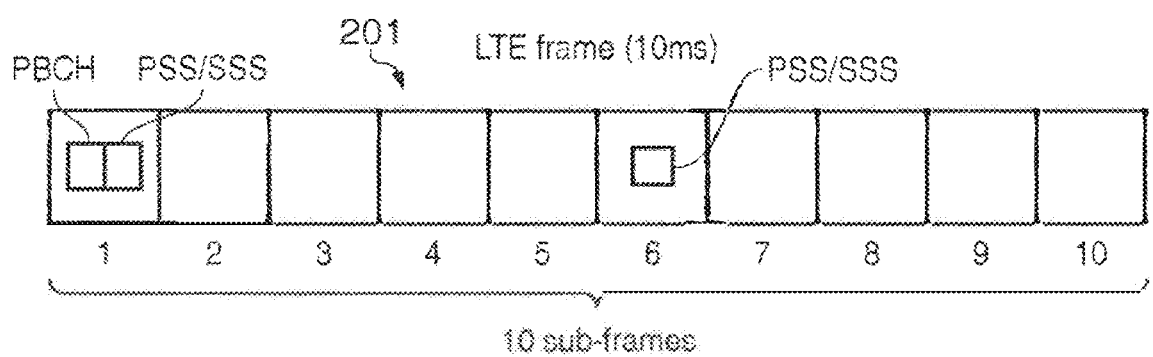
FIG. 2 schematically represents some aspects of a LTE downlink radio frame structure.

Mobile telecommunications systems such as those arranged in accordance with the 3GPP defined Long Term Evolution (LTE) architecture use an orthogonal frequency division multiplex (OFDM) based interface for the radio downlink (so-called OFDMA) and a single carrier frequency division multiplex based interface for the radio uplink (so-called SC-FDMA). FIG. 2 shows a schematic diagram illustrating an OFDM based LTE downlink radio frame 201. The LTE downlink radio frame is transmitted from an LTE base station (known as an enhanced Node B) and lasts 10 ms. The downlink radio frame comprises ten subframes, each subframe lasting 1 ms. A primary synchronisation signal (PSS) and a secondary synchronisation signal (SSS) are transmitted in the first and sixth subframes of the LTE frame. A physical broadcast channel (PBCH) is transmitted in the first subframe of the LTE frame.

Figure 3:
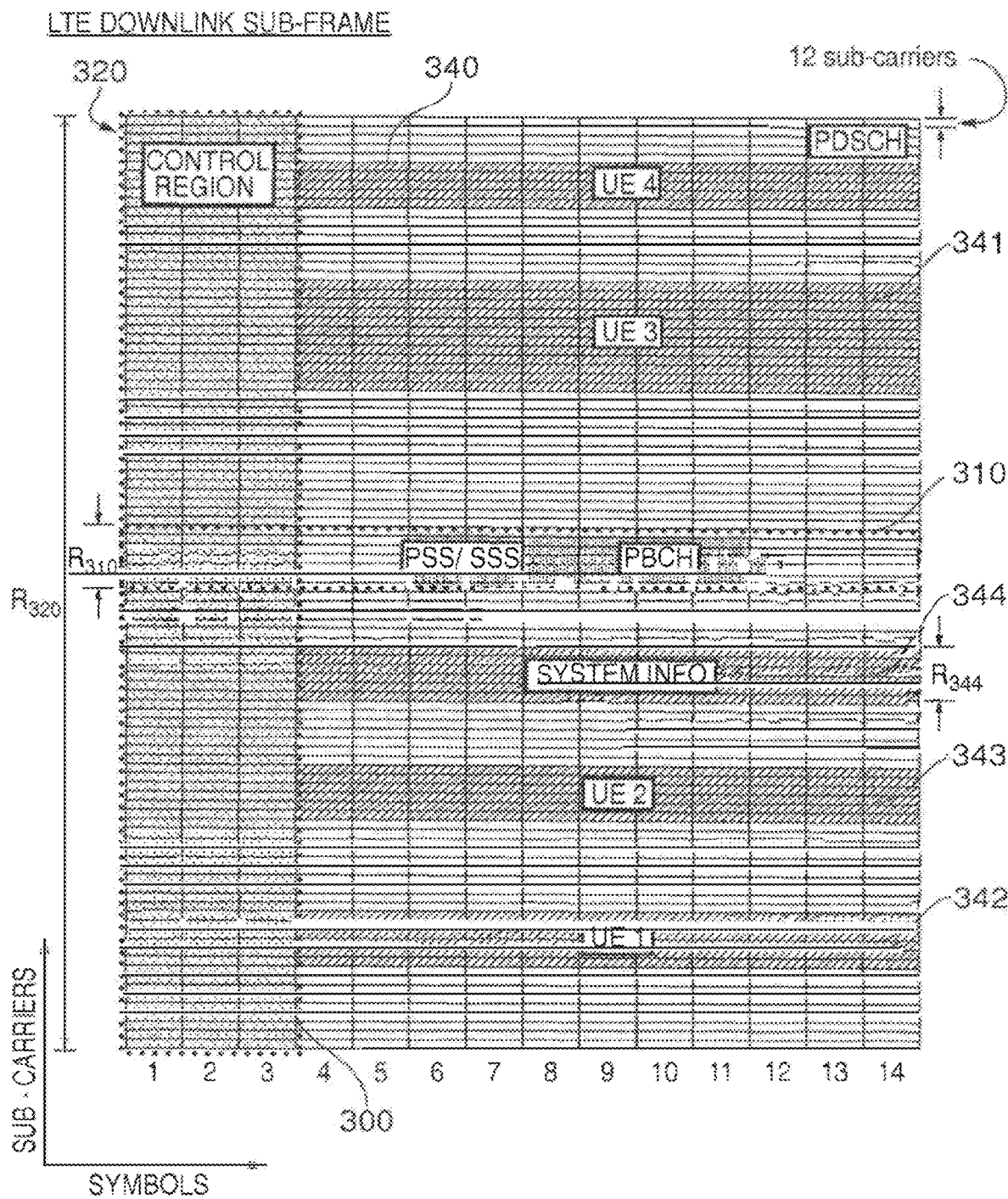
FIG. 3 schematically represents some aspects of a LTE downlink radio subframe structure.

FIG. 3 is a schematic diagram of a grid which illustrates the structure of an example conventional downlink LTE subframe (corresponding in this example to the first, i.e. left-most, subframe in the frame of FIG. 2). The subframe comprises a predetermined number of symbols which are transmitted over a 1ms period. Each symbol comprises a predetermined number of orthogonal sub-carriers distributed across the bandwidth of the downlink radio carrier.

The example subframe shown in FIG. 3 comprises 14 symbols and 1200 sub-carriers spread across a 20 MHz bandwidth. The smallest allocation of user data for transmission in LTE is a resource block comprising twelve sub-carriers transmitted over one slot (0.5 subframe). For clarity, in FIG. 3, each individual resource element (a resource element comprises a single symbol on a single subcarrier) is not shown, instead each individual box in the subframe grid corresponds to twelve sub-carriers transmitted on one symbol.

FIG. 3 shows resource allocations for four LTE terminals 340, 341, 342, 343. For example, the resource allocation 342 for a first LTE terminal (UE 1) extends over five blocks of twelve sub-carriers (i.e. 60 sub-carriers), the resource allocation 343 for a second LTE terminal (UE2) extends over six blocks of twelve sub-carriers and so on.

Control channel data are transmitted in a control region 300 (indicated by dotted-shading in FIG. 3) of the subframe comprising the first n symbols of the subframe where n can vary between one and three symbols for channel bandwidths of 3 MHz or greater and where n can vary between two and four symbols for channel bandwidths of 1.4 MHz. For the sake of providing a concrete example, the following description relates to carriers with a channel bandwidth of 3 MHz or greater so the maximum value of n will be 3. The data transmitted in the control region 300 includes data transmitted on the physical downlink control channel (PDCCH), the physical control format indicator channel (PCFICH) and the physical HARQ indicator channel (PHICH).

PDCCH contains control data indicating which sub-carriers on which symbols of the subframe have been allocated to specific LTE terminals. Thus, the PDCCH data transmitted in the control region 300 of the subframe shown in FIG. 3 would indicate that UE1 has been allocated the block of resources identified by reference numeral 342, that UE2 has been allocated the block of resources identified by reference numeral 343, and so on.

PCFICH contains control data indicating the size of the control region (i.e. between one and three symbols).

PHICH contains HARQ (Hybrid Automatic Request) data indicating whether or not previously transmitted uplink data has been successfully received by the network.

Symbols in a central band 310 of the time-frequency resource grid are used for the transmission of information including the primary synchronisation signal (PSS), the secondary synchronisation signal (SSS) and the physical broadcast channel (PBCH). This central band 310 is typically 72 sub-carriers wide (corresponding to a transmission bandwidth of 1.08 MHz). The PSS and SSS are synchronisation signals that once detected allow an LTE terminal device to achieve frame synchronisation and determine the cell identity of the enhanced Node B transmitting the downlink signal. The PBCH carries information about the cell, comprising a master information block (MIB) that includes parameters that LTE terminals use to properly access the cell. Data transmitted to individual LTE terminals on the physical downlink shared channel (PDSCH) can be transmitted in other resource elements of the subframe.

FIG. 3 also shows a region of PDSCH containing system information and extending over a bandwidth of R344.

A conventional LTE frame will also include reference signals which are not shown in FIG. 3 in the interests of clarity.

Figure 4:
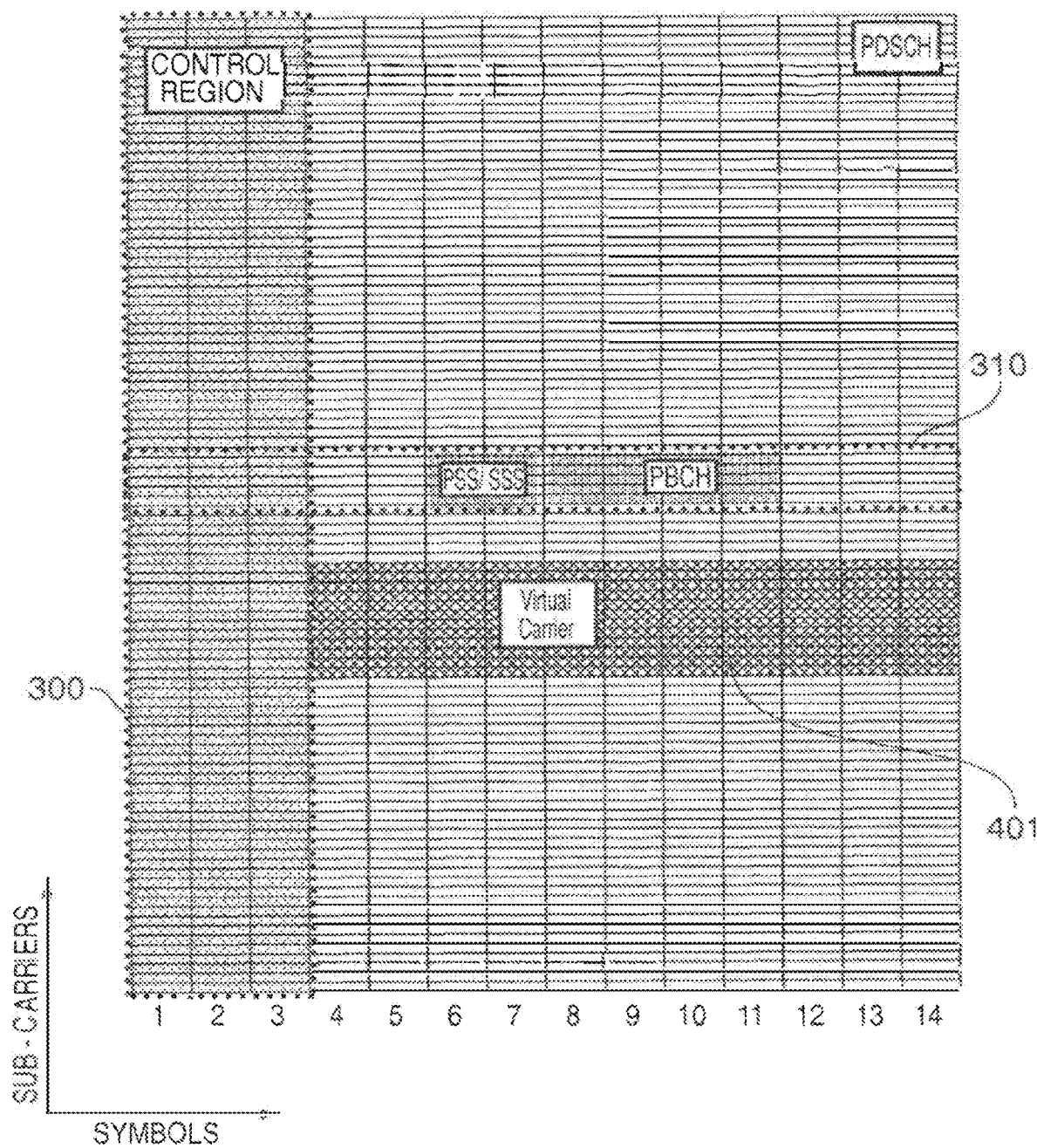
FIG. 4 schematically represents some aspects of a LTE downlink radio subframe structure associated with a host carrier supporting a virtual carrier.

FIG. 4 is a diagram which is similar to and will in many respect be understood from FIG. 3. However, FIG. 4 differs from FIG. 3 in schematically representing a downlink radio subframe corresponding to a host carrier in which a virtual carrier 401 (VC) is supported. The general operation of the virtual carrier represented in FIG. 4 may be in accordance with previously-proposed schemes, for example as described in any of the above-identified documents [2] to [11]. The virtual carrier thus represents a restricted subset of downlink transmission resources within the overall transmission resource grid associated with the host carrier which may be used for communicating at least some information with certain types of terminal devices, for example, reduced capability machine type communication terminal devices.

Thus, a conventional (i.e. non-reduced capability) terminal device may be supported using the full bandwidth of the resource grid represented in FIG. 4 in accordance with conventional LTE techniques. Downlink communications for a reduced capability terminal device, on the other hand, may be restricted to a subset of transmission resources within the virtual carrier.

In some cases the entirety of the downlink communications for the reduced-capability terminal device (i.e. including control signalling and higher layer/user-plane data) may be conveyed within the transmission resources of one of the virtual carriers, for example in accordance with the principles proposed in the above-identified documents [2] to [9]. This may be appropriate, for example, for a terminal device which cannot receive the full bandwidth of the host carrier (and hence cannot receive the entirety of the control region 300).

In other cases the reduced capability terminal device may be able to receive the full-bandwidth of the host carrier (and hence receive and decode the control region 300), but may be restricted as to its ability to buffer and decodes the entirety of the PDSCH region, and so may buffer and decode only a subset of the downlink transmission resources spanning the virtual carrier to which the terminal device has been allocated, for example in accordance with the "T-shaped allocation" principles proposed in the above-identified documents [10] and [11]. While this mode of operation may be referred to as a "T-shaped allocation" mode of operation for ease of reference, the PDSCH resources allocated to the reduced capability terminal device need not be contiguous in frequency. That is to say that while the virtual carrier resources schematically represented in FIG. 4 are shown as a continuous block, in some examples the restricted subset of resources may be a subset of OFDM carriers distributed (spread) across the system bandwidth. Furthermore, it will be appreciated the subset of OFDM subcarriers comprising a virtual carrier for one particular terminal device may be different from a subset of OFDM subcarriers associated with supporting virtual carrier operation for another terminal device.

As noted above, virtual carrier operation can have an impact on how system information changes can be received by a reduced capability terminal device.

In an LTE-based wireless telecommunications system some of the fundamental information required for a terminal device to operate in a cell is transmitted on PBCH in the Master Information Block (MIB). Other information regarding the system configuration is divided among System Information Blocks (SIBs) referred to as SIB1, SIB2, SIB3, . . . etc. (there are 16 SIBs defined as of Release 11 LTE). The SIBs are transmitted in system information (SI) messages, which, apart from SIB1, may contain multiple SIBs. There may be one or several SI messages transmitted at different periodicities. Each SI message may convey multiple SIBs suitable for scheduling with the same periodicity. The timings for SIB1 transmissions are fixed on an 80 ms period and they occur in the fifth subframe of radio frames when System Frame Number (SFN) is a multiple of 8 (i.e. SFN mod 8=0). There are retransmissions of SIB1 provided in every other radio frame within the 80 ms period. The timings for other SIB transmissions are configured in SIB1. The transmission resource allocations for the SI messages on PDSCH within a subframe are provided to terminal devices using PDCCH allocation messages addressed to SI-RNTI (System Information Radio Network Temporary Identifier—currently 0xFFFF in LTE). At higher layers, SI is carried on the logical broadcast control channel (BCCH).

The system information in a cell may be changed, although typically this happens rarely with system information perhaps remaining unchanged for hours, days, or even weeks.

For changes of system information other than those related to EAB (Extended Access Barring), ETWS (Earthquake Tsunami Warning System) and CMAS (Commercial Mobile Alert System), there is a BCCH modification period defined (which may be referred to as a "SI modification period"). SI modification period boundaries are defined on radio frames for which SFN mod q=0, for a cell-specific value of q. When there is a change in system information, the new system information is transmitted from the start of a new SI modification period.

The general process for implementing a change in system information in an LTE-based network is described, for example, in Section 5.2.1.3 of ETSI TS 136 331 V11.4.0 (2013-07)/3GPP TS 36.331 version 11.4.0 Release 11 [13]. In summary, a base station indicates a change of system information as follows.

1. When the network changes system information it notifies terminal devices about the change by transmitting a PDCCH resource allocation message addressed to the paging RNTI (P-RNTI). This directs the terminal devices to decode PDSCH resources containing a Paging message with a SystemInfoModification flag set to true. This may be done, for example, throughout one SI modification period. Both RRC_IDLE and RRC_CONNECTED terminal devices check for paging messages periodically. It may be noted that EAB alterations, ETWS and CMAS notifications may be separately modified with separate flags in a paging message (but can also be modified along with other SIBs).

2. In a following SI modification period, the network transmits the modified system information, and may increment a SystemInfoValueTag in SIB1. This value tag can indicate changes in any SIB, but it might not be used for EAB, ETWS, CMAS and some regularly changing SI parameters such as CDMA2000 system time. Terminal devices can use SystemInfoValueTag to verify if currently stored system information is still valid, for example on return from being out of coverage when the UE may have missed a system information change notification in paging.

More details on system information and changes in system information in an LTE-based system can be found in ETSI TS 136 331 V11.4.0 (2013-07)/3GPP TS 36.331 version 11.4.0 Release 11 [13].

As discussed above, it has been proposed to reduce the complexity of an LTE modem by reducing the baseband bandwidth over which certain types of terminal device operate. In particular, it may be desirable to reduce at least the baseband bandwidth over which the terminal device is to receive PDSCH (i.e. using T-shaped allocation virtual carrier techniques). This can have the advantages of lowering the complexity of subframe buffering, post-FFT buffering, channel estimation, and turbo decoding; and lower complexity creates an opportunity for lower modem cost and also reduced operational power consumption. Low complexity modems are particularly attractive for use in machine-type communication (MTC) terminal devices.

Such a reduced capability terminal device might, for example, be adapted to receive PDCCH across a full system bandwidth spanning n physical resource blocks (PRBs), e.g. n=50 PRBs for a system bandwidth of 10 MHz at baseband. However, the terminal device might be adapted to receive PDSCH in a maximum of m PRBs, where m is less than n. For example m=6, corresponding to an effective bandwidth of 1.4 MHz at baseband for PDSCH.

The buffering requirements can be reduced if the UE is given an indication of which m PDSCH PRBs it must buffer before it needs to decode them, so that a buffer suitable for 6 instead of 50 PRBs can be provided. Since the RF bandwidth is not changed, these 6 PDSCH PRBs could be anywhere within the system bandwidth and, in general, might be contiguous or non-contiguous in frequency per subframe. In the subframe in which PDSCH decoding occurs, PDCCH can schedule any subset or the whole of the 6 PRBs since all 6 have been buffered by the UE. Some example techniques for establishing the predetermined subset of PDSCH resources to buffer at the terminal device can be found in GB 2 497 743 [10] and GB 2 497 742 [11], but in general any suitable technique can be used.

The restricted subset of transmission resources on which a reduced capability terminal device can receive PDSCH in a given subframe impacts how system information messages should be handled in the wireless telecommunications system. A PDCCH resource allocation to SI-RNTI to indicate a change in system information is transmitted in the PDCCH common search space, and therefore all terminal devices receive the relevant SIBs using the same PDSCH resources (at least for system information which is relevant for all terminal devices). To be receivable by a reduced capability terminal device, the SIBs should be scheduled on physical resource blocks which the reduced capability terminal device will buffer in the relevant subframe. Furthermore, this will be a restricted number of PRBs, e.g. requiring SIBs to be transmitted within m (e.g. m=6) PRBs.

However, the base station also needs send user data to reduced capability (low complexity) terminal devices using the restricted subset of PDSCH resources for the terminal device. To help increase the number of reduced capability terminal devices that can be supported in a network and overall scheduling flexibility, it can be helpful if different reduced capability terminal devices can operate using different restricted subsets of transmission resources. This means the PDSCH resource blocks which different terminal devices are buffering to receive their own user data will not in general be the same resource blocks in which system information (SIBs) is sent. The previously proposed schemes for virtual carrier operation have addressed how a terminal device can acquire system information when attaching to a network, notwithstanding the terminal device's ability to decode only a restricted subset of PDSCH resources in a given subframe. However, different techniques may be needed when a reduced capability terminal device is to acquire new system information, for example because of a change in system information, while it is connected to the network (e.g. in RRC connected mode).

Figure 5:
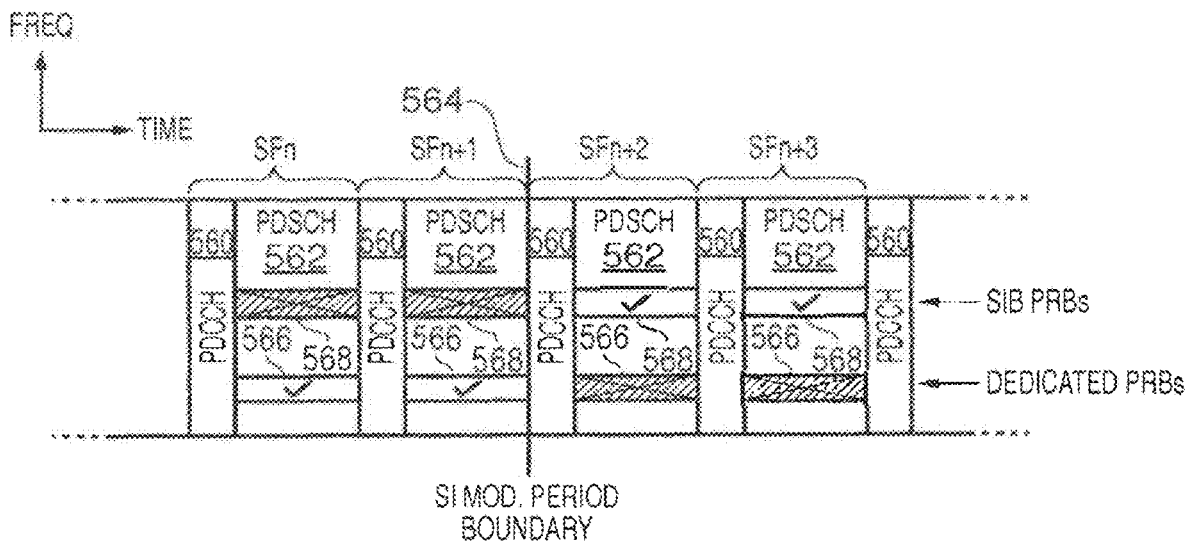
FIG. 5 schematically represents some aspects of a series of radio subframes spanning a system information modification period boundary for a host carrier supporting a virtual carrier.

FIG. 5 schematically represents a downlink frequency resource grid spanning four subframes labelled as SFn, SFn+1, SFn+2 and SFn+3 for an LTE-based wireless telecommunications system supporting a virtual carrier mode of operation in which a reduced capability terminal device is restricted to buffering a subset of PDSCH resources while being able to receive the full bandwidth of PDCCH resources. As described above, each subframe comprises a PDCCH region 560 and a PDSCH region 562. Subframes SFn+1 and SFn+2 are assumed to span a system information modification period boundary 564, as schematically represented in the figure. Schematically represented in the PDSCH region of each subframe is an indication of the subset of transmission resources 566 which an example reduced capability terminal device would use if it were receiving a user-plane data. These may be referred to as dedicated physical resource blocks for the reduced capability terminal device. Also schematically represented in the PDSCH region of each subframe is an indication of the transmission resources 568 the base station would use if it were transmitting system information blocks in the relevant subframe. These may be referred to as SIB physical resource blocks. It will be appreciated the respective sets of transmission resources 566, 568 are shown as contiguous blocks occurring at the same place in each subframe purely for ease of representation. In practice the resources 566 comprising the dedicated PRBs for the reduced capability terminal device may not be contiguous and their position and frequency may change in different subframes. Likewise for the resources 566 comprising the SIB PRBs (i.e. they may in general be scheduled on different frequency resources in each subframe).

In subframes SFn and SFn+1 the reduced capability terminal device is assumed to be operating in a known "T-shaped" virtual carrier mode of operation in which it buffers the full PDCCH region 560 and the restricted subset of PDSCH transmission resources 566 established for dedicated user-plane data transmissions for the reduced capability terminal device. While the device is buffering the dedicated PRBs 566 it is unable to buffer the transmission resources 568 used by the network for transmitting system information. This is schematically represented in FIG. 5 by a tick mark in the PDSCH transmission resources 566 comprising the dedicated PRBs and a cross mark and shading in the PDSCH resources 568 comprising the SIB PRBs.

In the schematic example represented in FIG. 5 it is assumed the base station is to make a change to system information at the system information modification period boundary 564 between subframes SFn+1 and SFn+2. The reason for the system information change in any given implementation is not significant to the operation of embodiments of the disclosure.

A reduced capability terminal device can receive a system information change notification from a base station in the same way as for a conventional terminal device in the conventional manner discussed above. Established techniques can also be used to inform the terminal device of the transmission resources used for transmitting system information (i.e. the resources 568 identified in FIG. 5 as SIB PRBs).

However, an issue arises in that the reduced capability terminal device must change (at least some of) the PRBs it is buffering from the dedicated PRBs 566 to the SIB PRBs 568 following the SI modification period boundary 564 if it is to receive the updated system information. This is schematically represented in FIG. 5 by a tick mark in the PDSCH transmission resources 568 comprising the SIB PRBs and a cross mark and shading in the PDSCH resources 566 comprising the dedicated PRBs.

While the reduced capability terminal device is receiving SIB transmissions the extent to which it can receive dedicated transmissions is reduced. In principle the base station may simply take this into account when scheduling dedicated transitions to the reduced-capability terminal devices in the network when there has been a change in system information. However, a problem with this is the base station will not be aware of when the terminal device(s) have acquired the new system information and so are ready to return to receiving dedicated transmissions on the relevant restricted subset of transmission resources.

The inventors have identified various mechanisms for handling this issue. One simple solution would be to simply ensure the subset of PDSCH resources to be buffered by all reduced capability terminal devices includes the transmission resources to be used for transmitting system information. However, it can be expected this approach will lead to an inefficient use of resources with high latencies and place restrictions on the number of reduced capability terminal devices that can be supported in the network and the data throughput that can be provided for such terminal devices. Another simple solution would be for the base station to in effect ignore the fact the reduced capability terminal devices will be unable to receive dedicated transmissions while they are acquiring new system information. That is to say, the base station may simply continue scheduling user data transmissions for the reduced capability terminal devices following the change in system information. The terminal devices will not be able to receive these scheduled transmissions (because they will be instead buffering the physical resource blocks used for SIB transmissions). Consequently, the reduced capability terminal devices will not acknowledge the dedicated transmissions scheduled by the base station while they are acquiring system information. Existing techniques (e.g. HARQ and RLC ARQ) for dealing with failed transmissions may then seek to recover the situation. In practice, this might involve the base station repeating the unacknowledged dedicated transmissions in subsequent subframes until an acknowledgement of successful transmission is received when the reduced capability terminal device has acquired the new system information and returned to buffering and decoding the PRBs used for dedicated transmissions. However, this approach results in wasted transmissions.

Another approach the inventors have conceived of involves a wireless telecommunications system configured such that a reduced capability terminal device does not seek to acquire system information on receipt of a change notification while in an RRC connected mode, but instead waits to acquire the new system after moving to an RRC idle mode.

As is well understood, in an LTE type network there are two Radio Resource Control (RRC) modes for terminal devices, namely: (i) RRC idle mode (RRC_IDLE); and (ii) RRC connected mode (RRC_CONNECTED). To receive user-plane data a terminal device must be in RRC connected mode and the terminal device does not receive user-plane data in RRC idle mode. In RRC idle mode, the core network (CN) part of the wireless telecommunications system recognizes the terminal device is present within the network, but the radio access network (RAN) part of the wireless telecommunications system does not. In effect, in an RRC idle mode the terminal device is not connected to the base station. The process of going from RRC idle mode to RRC connected mode may be referred to as connecting to a cell.

Figure 6:
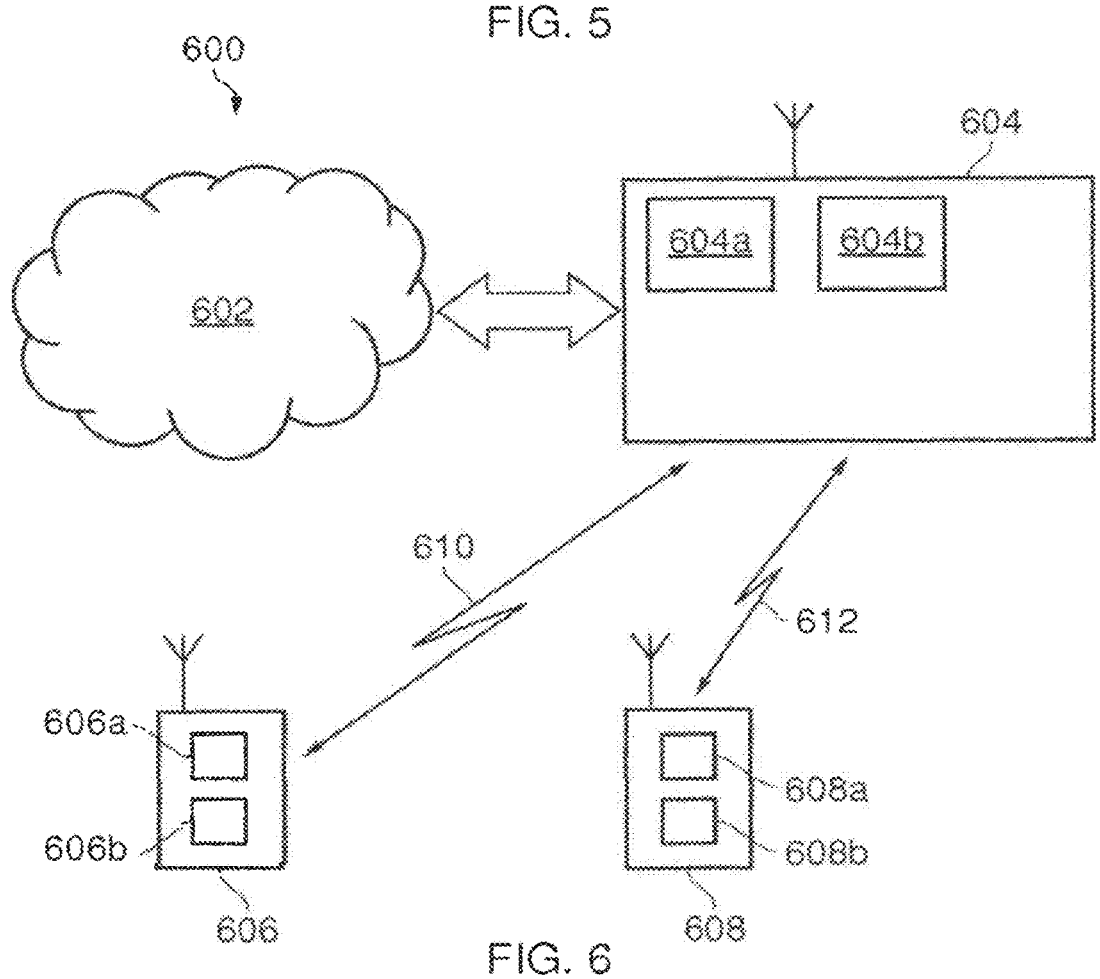
FIG. 6 schematically represents an adapted LTE-type wireless telecommunications system arranged in accordance with an example of the present disclosure.

FIG. 6 schematically shows a telecommunications system 600 according to an embodiment of the present disclosure. The telecommunications system 600 in this example is based broadly around an LTE-type architecture which supports virtual carrier operations such as discussed above. Many aspects of the operation of the telecommunications system 600 are known and understood and are not described here in detail in the interest of brevity. Operational aspects of the telecommunications system 600 which are not specifically described herein may be implemented in accordance with any known techniques, for example according to the current LTE-standards with modifications as appropriate to incorporate virtual carrier operation, such as disclosed in GB 2 487 906 [2], GB 2 487 908 [3], GB 2 487 780 [4], GB 2 488 613 [5], GB 2 487 757 [6], GB 2 487 909 [7], GB 2 487 907 [8], GB 2 487 782 [9], GB 2 497 743 [10] and GB 2 497 742 [11], the entire contents of which are incorporated herein by reference.

The telecommunications system 600 comprises a core network part (evolved packet core) 602 coupled to a radio network part. The radio network part comprises a base station (evolved-nodeB) 604 coupled to a plurality of terminal devices. In this example, two terminal devices are shown, namely a first terminal device 606 and a second terminal device 608. It will of course be appreciated that in practice the radio network part may comprise a plurality of base stations serving a larger number of terminal devices across various communication cells. However, only a single base station and two terminal devices are shown in FIG. 6 in the interests of simplicity.

As with a conventional mobile radio network, the terminal devices 606, 608 are arranged to communicate data to and from the base station (transceiver station) 604. The base station is in turn communicatively connected to a serving gateway, S-GW, (not shown) in the core network part which is arranged to perform routing and management of mobile communications services to the terminal devices in the telecommunications system 600 via the base station 604. In order to maintain mobility management and connectivity, the core network part 602 also includes a mobility management entity (not shown) which manages the enhanced packet service, EPS, connections with the terminal devices 606, 608 operating in the communications system based on subscriber information stored in a home subscriber server, HSS. Other network components in the core network (also not shown for simplicity) include a policy charging and resource function, PCRF, and a packet data network gateway, PDN-GW, which provides a connection from the core network part 602 to an external packet data network, for example the Internet. As noted above, the operation of the various elements of the communications system 600 shown in FIG. 6 may be broadly conventional, for example in accordance with established telecoms standards and the principles set out in the referenced documents mentioned herein, apart from where modified to provide functionality in accordance with embodiments of the present disclosure as discussed herein.

In this example, it is assumed the first terminal device 606 is a conventional smartphone type terminal device communicating with the base station 604 in a conventional manner. This conventional terminal device 606 comprises a transceiver unit 606a for transmission and reception of wireless signals and a processor unit (controller unit) 606b configured to control the device 606. The processor unit 606b may comprise a processor unit which is suitably configured/programmed to provide the desired functionality using conventional programming/configuration techniques for equipment in wireless telecommunications systems. The transceiver unit 606a and the processor unit 606b are schematically shown in FIG. 6 as separate elements. However, it will be appreciated that the functionality of these units can be provided in various different ways, for example using a single suitably programmed general purpose computer, or suitably configured application-specific integrated circuit(s)/circuitry. As will be appreciated the conventional terminal device 606 will in general comprise various other elements associated with its operating functionality.

In this example, it is assumed the second terminal device 608 is a machine-type communication (MTC) terminal device 604 adapted to operate in a virtual carrier (VC) mode in accordance with embodiments of the present disclosure when communicating with the base station 604. As discussed above, machine-type communication terminal devices can in some cases be typically characterised as semi-autonomous or autonomous wireless communication devices communicating small amounts of data. Examples include so-called smart meters which, for example, may be located in a customer's house and periodically transmit information back to a central MTC server data relating to the customer's consumption of a utility such as gas, water, electricity and so on. MTC devices may in some respects be seen as devices which can be supported by relatively low bandwidth communication channels having relatively low quality of service (QoS), for example in terms of latency. It is assumed here the MTC terminal device 608 in FIG. 6 is such a device.

The MTC device 608 comprises a transceiver unit 608a for transmission and reception of wireless signals and a processor unit (controller unit) 608b configured to control the MTC device 608. The processor unit 608b may comprise various sub-units for providing functionality in accordance with some embodiments of the present disclosure as explained further herein. These sub-units may be implemented as discrete hardware elements or as appropriately configured functions of the processor unit. Thus the processor unit 608b may comprise a processor which is suitably configured/programmed to provide the desired functionality described herein using conventional programming/configuration techniques for equipment in wireless telecommunications systems. The transceiver unit 608a and the processor unit 608b are schematically shown in FIG. 6 as separate elements for ease of representation. However, it will be appreciated that the functionality of these units can be provided in various different ways, for example using a single suitably programmed general purpose computer, or suitably configured application-specific integrated circuit(s)/circuitry, or using a plurality of discrete circuitry/processing elements for providing different elements of the desired functionality. It will be appreciated the MTC device 608 will in general comprise various other elements associated with its operating functionality in accordance with established wireless telecommunications techniques.

The base station 604 comprises a transceiver unit 604a for transmission and reception of wireless signals and a processor unit (controller unit) 604b configured to control the base station 604 to operate in accordance with embodiments of the present disclosure as described herein. The processor unit 606b may again comprise various sub-units for providing functionality in accordance with embodiments of the present disclosure as explained further below. These sub-units may be implemented as discrete hardware elements or as appropriately configured functions of the processor unit. Thus, the processor unit 604*b* may comprise a processor which is suitably configured/programmed to provide the desired functionality described herein using conventional programming/configuration techniques for equipment in wireless telecommunications systems. The transceiver unit 604*a* and the processor unit 604*b* are schematically shown in FIG. 6 as separate elements for ease of representation. However, it will be appreciated that the functionality of these units can be provided in various different ways, for example using a single suitably programmed general purpose computer, or suitably configured application-specific integrated circuit(s)/circuitry or using a plurality of discrete circuitry/processing elements for providing different elements of the desired functionality. It will be appreciated the base station 604 will in general comprise various other elements associated with its operating functionality in accordance with established wireless telecommunications techniques.

Thus, the base station 604 is configured to communicate data with both the conventional terminal device 606 and the terminal device 608 according to an embodiment of the disclosure over respective communication links 610, 612. The communication link 610 for communications between the base station 604 and the conventional terminal device 606 is supported by a host carrier (e.g. potentially making use of the full range of transmission resources schematically represented in FIG. 4). The communication link 612 for communications between the base station 604 and the reduced-capability MTC terminal device 608 is supported by a virtual carrier (e.g. making use of resources within a restricted subset of frequency resources such as the virtual carrier schematically represented in FIG. 4). Communications between the MTC terminal device 608 and the base station 604 may generally be based on any of the previously proposed schemes for virtual carrier operation with modification as described herein to provide functionality in accordance with certain embodiments of the disclosure. For example, the MTC terminal device 608 may operate such that all control-plane and user-plane signalling from the base station 604 which is addressed to the terminal device 608 is made within the subset of frequency resources (OFDM carriers) allocated to the virtual carrier provided for the terminal device 608. Alternatively, control-plane signalling from the base station 604 which is addressed to the terminal device 608 may be made within the full-bandwidth of the control region 300 represented in FIG. 4, with higher-layer data (user-plane data) being communicated within the restricted frequency resources (OFDM carriers) allocated to the virtual carrier provided for the terminal device 608.

Figure 7:
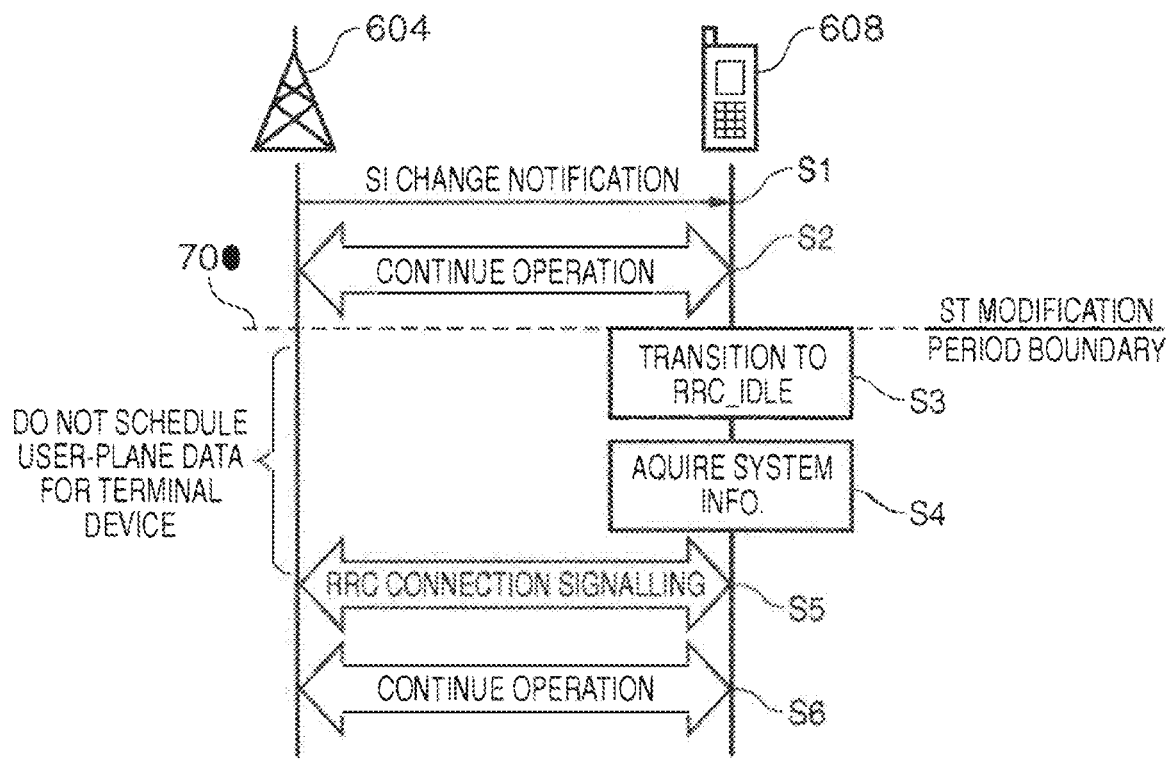
FIG. 7 is a signalling ladder-diagram schematically representing methods of operation in accordance with certain examples of the present disclosure.

FIG. 7 is a signalling ladder diagram schematically representing modes of operation for the terminal device 608 and the base station 604 schematically represented in FIG. 6 in accordance with some embodiments of the present disclosure.

In a first step S1 represented in FIG. 7 the base station 604 transmits a system information (SI) change (update) notification and this is received by the terminal device 608. The terminal device 608 is assumed to be in RRC connected mode when the SI change notification is transmitted by the base station, for example because the terminal device 608 is in the process of receiving downlink data from the base station 604. The system information change notification may be transmitted on a paging channel in accordance with conventional techniques such as described above. The reason why the base station is updating the system information is not significant. Accordingly, at step S1 of the method represented in FIG. 7 the reduced capability terminal device 608 receives from the base station 604 an indication that updated system information is to be broadcast by the base station.

In accordance with conventional techniques, the base station 604 is configured to start broadcasting the new updated system information from a time point corresponding to a system information modification period boundary following the SI change notification. The timing of the relevant SI modification period boundary is schematically represented in FIG. 7 by a dotted line 700.

After the transmission of the system information change notification in step S1, and prior to the SI modification period boundary 700 when the base station starts transmitting the new system information, communications between the base station 604 and the terminal device 608 may continue as normal, as schematically represented in step S2. That is to say, the base station 604 and terminal device 608 may continue communicating in accordance with the virtual carrier mode of operation being implemented in the wireless telecommunications network. In this example it is assumed the base station and the terminal device are using a T-shaped virtual carrier mode of operation, such as proposed in GB 2 497 743 [10] and GB 2 497 742 [11].

In response to receiving the SI change notification in step S1, the terminal device is in accordance with an example of the present disclosure configured to transition from RRC connected mode to RRC idle mode. This is schematically represented in step S3 in FIG. 7. In this example the terminal device is configured to automatically transition to RRC idle mode at the next SI modification period boundary following the SI change notification in step S1. Thus in this example the terminal device transitions from RRC connected to RRC idle mode without receiving any explicit instruction to do so from the base station.

Once in RRC idle mode the terminal device 608 acquires system information in accordance with known techniques associated with virtual carrier operation. This is schematically represented in step S4 of FIG. 7.

When, after having acquired the updated system information in step S4, the terminal device 608 proceeds to reconnect to the base station 604 using conventional RRC connection signalling techniques, as schematically represented in FIG. 7 by step S5, this may be performed in accordance with known techniques associated with virtual carrier operation. After acquiring system information in the idle mode, the terminal device may delay reconnecting to the base station until it is triggered to do so in accordance with its normal operating behaviour in the wireless telecommunications system. For example, the terminal device might not return to RRC connected mode as soon as the updated system information is acquired, but might instead simply remain in idle mode until it is triggered to reconnect to the network by the non-access stratum (NAS) indicating there is new data requiring uplink to the base station.

After the terminal device 608 has re-entered RRC connected mode in step S5, communications between the base station 604 and the terminal device 608 may continue as normal, as schematically represented in step S6. That is to say, the base station 604 and terminal device 608 may communicate in accordance with the virtual carrier mode of operation being implemented in the wireless telecommunications network.

The base station 604 is aware that the terminal device is configured to automatically transition to RRC idle mode at the SI modification period boundary 700 following the SI change notification in step S1. Accordingly, the base station does not schedule any user-plane data for transmission to the terminal device from this time associated with the transmission of the updated system information until after the RRC connection has been re-established in step S5.

Thus, in accordance with the approach represented in FIG. 7, the reduced capability terminal device 608 is able to acquire system information without missing any user-plane data scheduled for the terminal device. The base station 604 can also avoid wasting transmission resources in seeking to send user-plane data to the terminal device when the terminal device cannot receive the user-plane data because (at least some) of the restricted subset of downlink transmission resources available to the reduced capability terminal device are needed to seek to acquire updated system information. The terminal device 608 is configured so that it does not seek to re-enter RRC connected mode in step S5 until after it has successfully acquired the system information. The base station therefore knows that once the terminal device 608 re-establishes RRC connection with the network in step S5, the terminal device 608 has successfully acquired the new system information. The base station (more particularly, the scheduling entity of the base station) is therefore free from this point to allocate user-plane data for transmission to the terminal device using the restricted subset of frequency resources (i.e. communications can continue as normal as schematically represented in step S6).

The approach represented in FIG. 7 may in some respects be referred to an implicit release approach in that the terminal device determines itself that it should transition from RRC connected mode to RRC idle mode without receiving any express instruction from the base station 604 to undertake this state change. This approach does not require any changes to existing RRC signalling protocols, and this can in some circumstances be seen as advantageous. Instead, the wireless telecommunications system is simply configured so that reduced capability terminal devices operating in RRC connected mode when an SI change notification is received should release themselves to RRC idle mode to seek to acquire the new system information, and furthermore should not seek to re-establish connection with the network (re-enter RRC connected mode) until after the system information has been successfully received during RRC idle mode.

It will be appreciated there are many variations on the approach represented in FIG. 7 that may be adopted. For example, in the example of FIG. 7 the terminal device 608 is configured to transition to RRC idle mode (step S3) at the SI modification period boundary 700 following receipt of an SI change notification. In another example of a terminal device may be configured to transition from RRC connected mode to RRC idle mode as soon as it receives an SI change notification. That is to say, there may be no period of continued operation corresponding to step S2 in FIG. 7 prior to the terminal device seeking to acquire system information whilst in RRC idle mode.

In another example, the time-point associated with the broadcast of the updated system information after which the base station restricts scheduling of user-plane data for the terminal device until it has re-entered RRC connected mode might correspond with the time at which the SI change notification is transmitted, instead of the time of the SI modification period boundary following the SI change notification. This may, for example, be appropriate in a case where the terminal device 608 is configured to transition to RRC idle without waiting until the next SI modification period boundary following the receipt of the SI change notification.

In a variation of the "implicit" released to RRC idle mode approach of FIG. 7, the terminal device 608 may be configured to in effect simply ignore the SI change notification and make no attempt to acquire the updated system information in response to receiving the system information change notification. Instead, the terminal device may simply store a record of the fact there has been a change in system information, for example this may be done by in effect invalidating the terminal device's existing system information, and continue to operate normally (so far as possible having regard to the change in system information). When the terminal device next enters RRC idle mode in accordance with its normal operating procedures it may then seek to acquire the updated system information. In accordance with this approach, the base station may not restrict scheduling of user-plane data for the terminal device while it remains in RRC connected mode.

Figure 8:
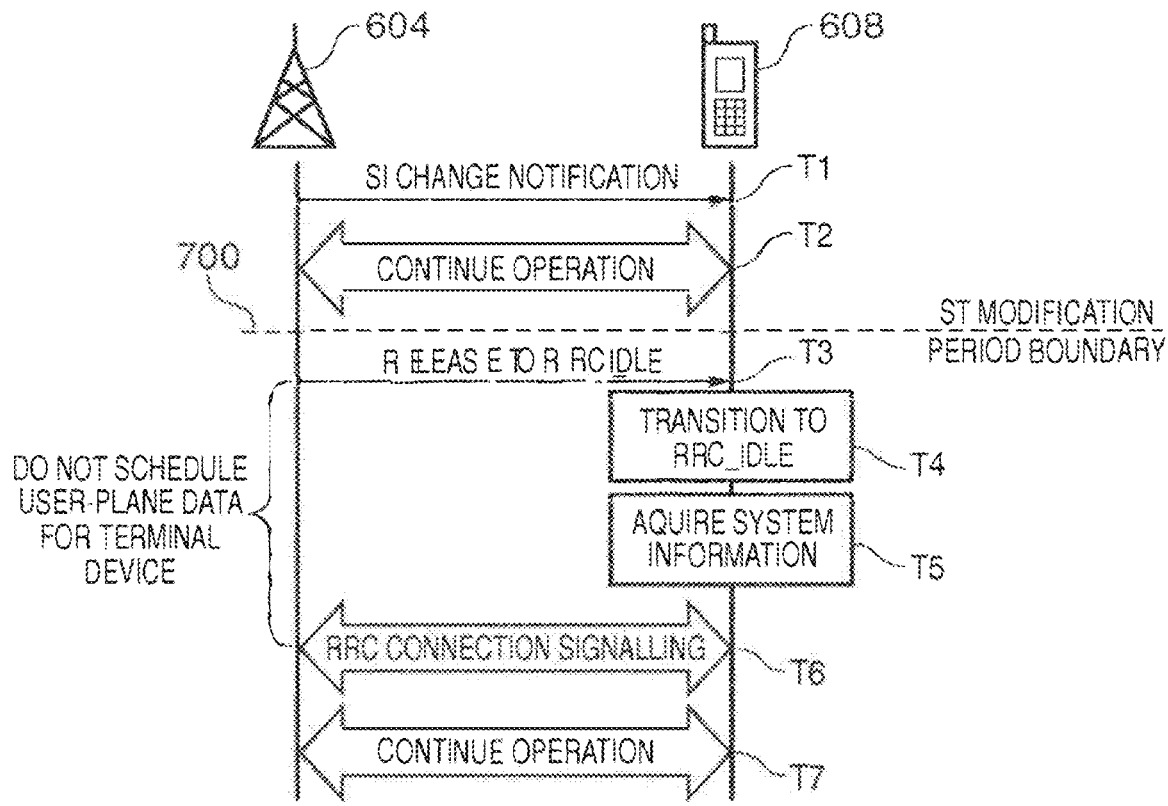
FIG. 8 is a signalling ladder-diagram schematically representing methods of operation in accordance with certain other examples of the present disclosure.

FIG. 8 is a signalling ladder diagram schematically representing modes of operation for the terminal device 608 and the base station 604 schematically represented in FIG. 6 in accordance with some other embodiments of the present disclosure. Whereas for the examples described above with reference to FIG. 7 the terminal device determines itself that it should transition to RRC idle mode following receipt of an SI change notification, in accordance with the approach represented in FIG. 8, the terminal device remains in RRC connected mode until instructed by the base station to move to RRC idle mode. Many of the steps represented in FIG. 8 are similar to, and will be understood from, corresponding steps represented in FIG. 7 and are not described again in detail in the interest of brevity.

Thus in a first step T1 the base station 604 transmits a system information (SI) change (update) notification and this is received by the terminal device 608 while in RRC connected mode. This step corresponds with step S1 represented in FIG. 7.

As discussed above, and in accordance with conventional techniques, the base station 604 is configured to start broadcasting the new updated system information from a time point corresponding to a system information modification period boundary following the SI change notification. The timing of the relevant SI modification period boundary is again schematically represented in FIG. 8 by a dotted line 700.

Following the transmission of the system information change notification in step T1, communications between the base station 604 and the terminal device 608 continue as normal, at least for a period of time, as schematically resented in FIG. 8 by step T2. That is to say, the base station 604 and terminal device 608 may continue communicating in accordance with the virtual carrier mode of operation being implemented in the wireless telecommunications network. In this example it is again assumed the base station and the terminal device are using a T-shaped virtual carrier mode of operation, such as proposed in GB 2 497 743 [10] and GB 2 497 742 [11].

In accordance with the approach represented in FIG. 8, the terminal device and the base station may continue to communicate in accordance with known virtual carrier techniques until the base station sends signalling to the terminal device to indicate the terminal device should transition to idle mode. This release to RRC idle signalling is schematically represented in FIG. 8 in step T3. In this example the release to RRC idle signalling of step T3 does not occur until after the SI modification period boundary 700. This may be, for example, because the base station wishes to complete the transfer of a particular block of data to the terminal device without interruption. Thus, the base station 604 and the terminal device 608 may continue communicating user-plane data beyond the SI modification period boundary 700. The terminal device is thus configured to in effect ignore, at least temporarily, the fact there has been a change in system information starting at SI modification boundary 700. In particular, the terminal device 608 is configured to make no attempt to acquire the updated system information whilst it remains in RRC connected mode. Instead the terminal device simply continues communicating with the base station in accordance with scheduling decisions and resource allocations made by the base station.

However, once the terminal device receives the release to RRC idle signalling in step T3, it transitions to RRC idle as schematically represented in FIG. 8 in step T4.

Once in RRC idle mode the terminal device 608 acquires system information in accordance with known techniques associated with virtual carrier operation. This is schematically represented in step S5 of FIG. 8 (corresponding to step S4 of FIG. 7).

When, after having acquired the updated system information in step T5, the terminal device 608 next proceeds to reconnect to the base station 604, it does so using conventional RRC connection signalling techniques, as schematically represented in FIG. 8 by step T6 (corresponding to step S5 of FIG. 7). This may be performed in accordance with known techniques associated with virtual carrier operation. As noted above, the trigger for the terminal device seeking to reconnect to the base station may arise in accordance with the terminal device's convention operating behaviour, for example in response to new uplink data becoming available.

After the terminal device 608 has re-entered RRC connected mode in step T6, communications between the base station 604 and the terminal device 608 may continue as normal. That is to say, the base station 604 and terminal device 608 may communicate in accordance with the virtual carrier mode of operation being implemented in the wireless telecommunications network, as schematically represented in FIG. 8 in step T7 (corresponding to step S6 in FIG. 7).

After the base station 604 instructs the terminal device 604 to transition to RRC idle in step T3 the base station does not schedule any user-plane data for transmission to the terminal device from this time until after the RRC connection has been re-established in step T6.

Thus, in accordance with the approach represented in FIG. 8, the reduced capability terminal device 608 is again able to acquire system information without missing any user-plane data scheduled for the terminal device. The base station 604 can also avoid wasting transmission resources in seeking to send user-plane data to the terminal device when the terminal device cannot receive the user-plane data because (at least some) of the restricted subset of downlink transmission resources available to the reduced capability terminal device are instead needed to seek to acquire updated system information. The terminal device 608 is configured so that it does not seek to re-enter RRC connected mode in step T6 until after it has successfully acquired the system information. The base station therefore knows that once the terminal device 608 re-establishes RRC connection with the network in step T6, the terminal device 608 has successfully acquired the new system information. The base station (more particularly, the scheduling entity of the base station) is therefore free from this point to allocate user-plane data for transmission to the terminal device using the restricted subset of frequency resources (i.e. communications can continue as normal as schematically represented in step T7).

The approach represented in FIG. 8, in contrast to the approach of FIG. 7, may in some respects be referred to as an explicit release approach in that the base station provides explicit instruction to the terminal device to transition from RRC connected mode to RRC idle mode. The release to RRC idle signalling represented in step T3 FIG. 8 may be based on conventional RRC signalling protocols. In accordance with some embodiments the RRC signalling represented in step T3 may be associated with a newly defined release cause or an additional flag to indicate the terminal device is being released for the purposes of SI update acquisition. This presence of such an indicator in the release to RRC idle signalling of step T3 can be used by the terminal device to determine that it should not attempt to reconnect to the network until after it has successfully acquired updated system information. Alternatively, the terminal device may simply determine that it should not seek to return to RRC connected mode until after it has acquired system information based on the fact there has been a previous SI change notification that the terminal device has not yet actioned. This could be implemented, for example, by the terminal device being configured to store a record to indicate its currently-stored system information is no longer valid following receipt of a system information change notification. This record can be cleared once the updated system information has been successfully acquired. Accordingly, if the terminal device receives an instruction to transition to RRC idle while its current system information is flagged as being no longer valid then the terminal device should wait to acquire system information before seeking to re-establish RRC connected mode.

As noted above, in some example embodiments the base station may be configured to expressly instruct the terminal device to transition to RRC idle mode to acquire system information using RRC release signalling with a newly-defined release cause or flag. In this case, the RRC release signalling may itself comprise the indication/notification that updated system information is to be broadcast by the base station to a plurality of terminal devices. Accordingly, a terminal device may be instructed to release to idle to acquire updated system information through RRC release signalling without the terminal device receiving a separate notification of an upcoming change in system information. Likewise, in an implementation in which another form of explicit signalling is adopted to instruct the terminal device to move to RRC idle mode, this signalling may itself comprise the indication/notification that updated system information is to be broadcast by the base station to a plurality of terminal devices.

An advantage of the approach of FIG. 8 is that the base station 604 can itself determine when individual terminal devices transition to RRC idle mode following a change in system information. This can allow the base station to reduce disruption for ongoing data transfers, for example by allowing these to be completed before releasing a particular terminal device to RRC idle mode to acquire the updated system information. However, it can in some circumstances lead to an increase in signalling overhead and so in some cases, for example if there are large numbers of reduced capability terminal devices operating in a system, the approach of FIG. 7 may be preferred.

In some situations a base station may wish to provide a system information change notification in association with system information that the terminal device should not delay receiving. For example, system information which is urgent/time critical, such as information relating to EAB (Extended Access Barring), ETWS (Earthquake Tsunami Warning System) and CMAS (Commercial Mobile Alert System). Accordingly, in some example embodiments of the present disclosure a system information change notification may be associated with an indication of whether or not the terminal device should transition to RRC idle mode to acquire the system information in accordance with the principles discussed herein, or whether the terminal device should seek to acquire the system information as soon as possible in accordance with conventional techniques (i.e. by seeking to decode the system information as soon as it is transmitted). This can help ensure time critical system information change educations are not delayed for terminal devices implementing an approach based on transitioning to RRC idle discussed herein.

It will be appreciated the physical resource blocks comprising the restricted subset of transmission resources may be different in different subframes. For example, referring to FIG. 7, the physical resources used to provide the restricted-bandwidth downlink channel in step S2 will typically be different from those used in step S6, and indeed the physical resources comprising the restricted subset of resources may be different within different subframes within step S2 and/or step S6. Furthermore, the bandwidth of the downlink channel provided by the restricted subset of transmission resources may be different in different subframes.

Furthermore still, although the embodiments described above have focussed on examples in which the terminal device 608 is a reduced capability terminal device configured to receive at least some communications from the base station within a restricted subset of transmission resources selected from within the system frequency bandwidth and comprising a downlink channel (e.g. a physical downlink shared channel, such as PDSCH in an LTE-based network) having a bandwidth which is narrower than the system frequency bandwidth, the same principles may be applied for a terminal device which does not have a reduced capability in this respect. That is to say, the same principles may be applied for a terminal device that is able to receive the relevant communications on a channel spanning the full system bandwidth (i.e. not operating on a virtual carrier).

Thus there has been described a wireless telecommunications system that comprises a base station and a terminal device. The system supports a virtual carrier mode of operation in which downlink communications are made by the base station using a radio interface that spans a system frequency bandwidth while the terminal device is configured to receive at least some communications from the base station within a restricted subset of transmission resources selected from within the system frequency bandwidth. The restricted subset of transmission resources provide a downlink channel having a baseband bandwidth which is less than the system frequency bandwidth. The wireless telecommunications system supports terminal devices in both a radio resource control connected mode (e.g. in which the base station transmits at least a type of user-plane data to a terminal devices) and a radio resource control idle mode (e.g. in which the base station does not transmit that type of user-plane data to terminal devices). When there is to be a change in system information the base station transmits to the terminal device an indication that updated system information is to be broadcast by the base station and this indication is received by the terminal device while in the connected mode. Before seeking to acquire the updated system information, the terminal device transitions from the connected mode to the idle mode. The terminal device then seeks to acquire updated system information while in the idle mode. The base station restricts the transmission of user-plane data to the terminal device until the terminal device re-enters connected mode. Transitioning to idle mode to acquire system information can help to address issues associated with managing the communication of both system information and user-plane data using the restricted subset of transmission resources.

Further particular and preferred aspects of the present invention are set out in the accompanying independent and dependent claims. It will be appreciated that features of the dependent claims may be combined with features of the independent claims in combinations other than those explicitly set out in the claims.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, define, in part, the scope of the foregoing claim terminology such that no inventive subject matter is dedicated to the public.

Some respective features of the present disclosure are defined by the following two groups of numbered paragraphs:

First Group of Numbered Paragraphs:

1. A method of operating a terminal device in a wireless telecommunications system in which downlink communications are made by a base station using a radio interface that spans a system frequency bandwidth and the terminal device is configured to receive at least some communications from the base station within a restricted subset of transmission resources selected from within the system frequency bandwidth and comprising a downlink channel having a channel bandwidth which is smaller than the system frequency bandwidth, and wherein the wireless telecommunications system supports a connected mode of operation in which the terminal device receives a type of user-plane data using the restricted subset of transmission resources and an idle mode of operation in which terminal device does not receive the type of user-plane data, the method comprising: receiving from the base station an indication that updated system information is to be broadcast by the base station, wherein the indication is received while the terminal device is in the connected mode; transitioning from the connected mode to the idle mode before seeking to acquire the updated system information; and seeking to acquire the updated system information broadcast by the base station while the terminal device is in the idle mode.

2. The method of paragraph 1, wherein the terminal device is restricted from transitioning from the idle mode back to the connected mode until after the terminal device has successfully acquired system information following the transition to the idle mode.

3. The method of paragraph 1 or 2, wherein the terminal device automatically transitions from the connected mode to the idle mode in response to receiving the indication that updated system information is to be broadcast by the base station.

4. The method of paragraph 1 or 2, wherein the terminal device transitions from the connected mode to the idle mode in response to receiving signalling from the base station to indicate the terminal device should transition from the connected mode to the idle mode.

5. The method of paragraph 4, wherein the indication that updated system information is to be broadcast by the base station is conveyed in association with the signalling from the base station to indicate the terminal device should transition from the connected mode to the idle mode.

6. The method of paragraph 4 or 5, wherein the signalling from the base station to indicate the terminal device should transition from the connected mode to the idle mode further indicates the terminal device should not transition from the idle mode back to the connected mode until after the terminal device has successfully acquired system information following the transition to the idle mode.

7. The method of any of paragraphs 4 to 6, wherein the signalling from the base station to indicate the terminal device should transition from the connected mode to the idle mode comprises an RRC Connection Release message.

8. The method of any of paragraphs 1 to 7, wherein transitioning from the connected mode to the idle mode occurs at a time associated with when the base station starts to broadcast the updated system information.

9. The method of any of paragraphs 1 to 8, wherein system information changes in the wireless telecommunications system are scheduled in accordance with a system information modification period, and wherein transitioning from the connected mode to the idle mode occurs at a time associated with a boundary of a system information modification period following the indication that updated system information is to be broadcast by the base station.

10. The method of any of paragraphs 1 to 9, further comprising the terminal device storing a record to indicate its currently stored system information is no longer valid after it has received the indication of the updated system information and until it has acquired the updated system information.

11. The method of any of paragraphs 1 to 10, further comprising determining the updated system information is not for a class of system information whose acquisition should not be delayed before transitioning from the connected mode to the idle mode to seek to acquire the updated system information.

12. The method of paragraph 1, further comprising the terminal device transitioning from the idle mode to the connected mode in response to acquiring the updated system information.

13. The method of any of paragraphs 1 to 12, wherein the terminal device continues to operate in connected mode without seeking to acquire the updated system information when it is broadcast by the base station.

14. The method of any of paragraphs 1 to 13, wherein the indication that updated system information is to be broadcast by the base station is received on a paging channel of the wireless telecommunications system.

15. The method of any of paragraphs 1 to 14, wherein the radio interface comprises a series of subframes and the physical resources corresponding to the restricted subset of transmission resources may be different for different subframes.

16. The method of any of paragraphs 1 to 15, wherein the terminal device is a machine type communication, MTC, terminal device.

17. A terminal device for use in a wireless telecommunications system in which downlink communications are made by a base station using a radio interface that spans a system frequency bandwidth and the terminal device is configured to receive at least some communications from the base station within a restricted subset of transmission resources selected from within the system frequency bandwidth and comprising a downlink channel having a channel bandwidth which is smaller than the system frequency bandwidth, and wherein the wireless telecommunications system supports a connected mode of operation in which the terminal device receives a type of user-plane data using the restricted subset of transmission resources and an idle mode of operation in which terminal device does not receive the type of user-plane data, wherein the terminal device comprises: a transceiver unit configured to receive from the base station an indication that updated system information is to be broadcast by the base station while the terminal device is in the connected mode; and a controller unit configured to cause the terminal device to transition from the connected mode to the idle mode before seeking to acquire the updated system information and to seek to acquire the updated system information broadcast by the base station while the terminal device is in the idle mode.

18. A wireless telecommunications system comprising the terminal device of paragraph 17 and a base station.

Second Group of Numbered Paragraphs:

1. A method of operating a base station in a wireless telecommunications system in which downlink communications are made by the base station using a radio interface that spans a system frequency bandwidth and the base station is configured to transmit at least some communications to at least one terminal device within a restricted subset of transmission resources selected from within the system frequency bandwidth and comprising a downlink channel having a channel bandwidth which is smaller than the system frequency bandwidth, and wherein the wireless telecommunications system supports the terminal device in a connected mode of operation in which the base station transmits a type of user-plane data to the terminal device using the restricted subset of transmission resources and an idle mode of operation in which the base station does not transmit the type of user-plane data to the terminal device, the method comprising: transmitting an indication that updated system information is to be broadcast by the base station, wherein the indication is transmitted while the terminal device is in the connected mode; and restricting the scheduling of user-plane data transmissions for the terminal device from a first time point after the transmission of the indication that updated system information is to be broadcast to a second time point after the terminal device re-enters the connected mode after having transitioned to the idle mode following the transmission of the indication that updated system information is to be broadcast.

2. The method of paragraph 1, further comprising the base station transmitting signalling to the terminal device to indicate the terminal device should transition from the connected mode to the idle mode.

3. The method of paragraph 2, wherein the indication that updated system information is to be broadcast by the base station is conveyed to the terminal device in association with the signalling to indicate the terminal device should transition from the connected mode to the idle mode.

4. The method of paragraph 2 or 3, wherein the signalling transmitted from the base station to indicate the terminal device should transition from the connected mode to the idle mode further indicates the terminal device should not re-enter the connected mode until after the terminal device has successfully acquired system information following the transition to the idle mode.

5. The method of any of paragraphs 2 to 4, wherein the signalling to indicate the terminal device should transition from the connected mode to the idle mode comprises an RRC Connection Release message.

6. The method of any of paragraphs 2 to 5, wherein the first time point from which the scheduling of user-plane data transmissions for the terminal device is restricted is based on the time of transmitting the signalling to the terminal device to indicate the terminal device should transition from the connected mode to the idle mode 7. The method of any of paragraphs 1 to 6, wherein the first time point from which the scheduling of user-plane data transmissions for the terminal device is restricted is a time associated with the broadcast of the updated system information.

8. The method of any of paragraphs 1 to 7, wherein the first time point from which the scheduling of user-plane data transmissions for the terminal device is restricted is a time when the base station starts to broadcast the updated system information.

9. The method of any of paragraphs 1 to 8, wherein system information changes in the wireless telecommunications system are scheduled in accordance with a system information modification period, and the first time point from which the scheduling of user-plane data transmissions for the terminal device is restricted is a time associated with a boundary of a system information modification period following the transmission of the indication that updated system information is to be broadcast by the base station.

10. The method of any of paragraphs 1 to 9, further comprising transmitting an indication that the updated system information relates to a class of system information whose acquisition should not be delayed by the terminal device transitioning from the connected mode to the idle mode before seeking to acquire the updated system information.

11. The method of any of paragraphs 1 to 10, wherein the indication that updated system information is to be broadcast by the base station is transmitted on a paging channel of the wireless telecommunications system.

12. The method of any of paragraphs 1 to 11, wherein the radio interface comprises a series of subframes and the physical resources corresponding to the restricted subset of transmission resources may be different for different subframes.

13. The method of any of paragraphs 1 to 12, wherein the terminal device is a machine type communication, MTC, terminal device.

14. A base station for use in a wireless telecommunications system in which downlink communications are made by the base station using a radio interface that spans a system frequency bandwidth and the base station is configured to transmit at least some communications to at least one terminal device within a restricted subset of transmission resources selected from within the system frequency bandwidth and comprising a downlink channel having a channel bandwidth which is smaller than the system frequency bandwidth, and wherein the wireless telecommunications system supports the terminal device in a connected mode of operation in which the base station transmits a type of user-plane data to the terminal device using the restricted subset of transmission resources and an idle mode of operation in which the base station does not transmit the type of user-plane data to the terminal device, wherein the base station comprises: a transceiver unit configured to transmit an indication that updated system information is to be broadcast by the base station while the terminal device is in the connected mode; and a controller unit configured to restrict the scheduling of user-plane data transmissions for the terminal device from a time associated with the broadcast of the updated system information until after the terminal device re-enters the connected mode after having transitioned to the idle mode following the transmission of the indication that updated system information is to be broadcast.

15. A wireless telecommunications system comprising the base station of paragraph 14 and a terminal device.

REFERENCES

[1] ETSI TS 122 368 V11.6.0 (2012-09)/3GPP TS 22.368 version 11.6.0 Release 11)
[2] GB 2 487 906 (UK patent application GB 1101970.0)
[3] GB 2 487 908 (UK patent application GB 1101981.7)
[4] GB 2 487 780 (UK patent application GB 1101966.8)
[5] GB 2 488 513 (UK patent application GB 1101983.3)
[6] GB 2 487 757 (UK patent application GB 1101853.8)
[7] GB 2 487 909 (UK patent application GB 1101982.5)
[8] GB 2 487 907 (UK patent application GB 1101980.9)
[9] GB 2 487 782 (UK patent application GB 1101972.6)
[10] GB 2 497 743 (UK patent application GB 1121767.6)
[11] GB 2 497 742 (UK patent application GB 1121766.8)
[12] Holma H. and Toskala A, "*LTE for UMTS OFDMA and SC-FDMA based radio access*", John Wiley and Sons, 2009
[13] ETSI TS 136 331 V11.4.0 (2013-07)/3GPP TS 36.331 version 11.4.0 Release 11)

What is claimed is:
1. A method of operating a terminal device in a wireless telecommunications system in which downlink communications are made by a base station using a radio interface that spans a system frequency bandwidth and the terminal device is configured to receive at least some communications from the base station within a restricted subset of transmission resources selected from within the system frequency bandwidth and comprising a downlink channel having a channel bandwidth which is smaller than the system frequency bandwidth, and wherein the wireless telecommunications system supports a Radio Resource Control (RRC) connected mode of operation in which the terminal device receives a type of user-plane data using the restricted subset of transmission resources and an RRC idle mode of operation in which terminal device does not receive the type of user-plane data, the method comprising:
    receiving from the base station a paging message comprising an indication that updated system information is to be broadcast by the base station, wherein the indication is received while the terminal device is in the RRC connected mode and indicates transmission resources to be used to broadcast the updated system information; and
    responsive to the indication that the updated system information is to be broadcast by the base station,
        transitioning from the RRC connected mode to the RRC idle mode before seeking to acquire the updated system information; and
        seeking to acquire the updated system information broadcast by the base station via the indicated transmission resources while the terminal device is in the RRC idle mode.

2. The method of claim 1, wherein the terminal device is restricted from transitioning from the RRC idle mode back to the RRC connected mode until after the terminal device has successfully acquired the updated system information following the transition to the RRC idle mode.

3. The method of claim 1, wherein the terminal device automatically transitions from the RRC connected mode to the RRC idle mode in response to receiving the indication that updated system information is to be broadcast by the base station.

4. The method of claim 1, wherein the terminal device transitions from the RRC connected mode to the RRC idle mode in response to receiving signalling from the base station to indicate the terminal device should transition from the RRC connected mode to the RRC idle mode.

5. The method of claim 4, wherein the indication that updated system information is to be broadcast by the base station is conveyed in association with the signalling from the base station to indicate the terminal device should transition from the RRC connected mode to the RRC idle mode.

6. The method of claim 4, wherein the signalling from the base station to indicate the terminal device should transition from the RRC connected mode to the RRC idle mode further indicates the terminal device should not transition from the RRC idle mode back to the RRC connected mode until after the terminal device has successfully acquired the updated system information following the transition to the RRC idle mode.

7. The method of claim 4, wherein the signalling from the base station to indicate the terminal device should transition from the RRC connected mode to the RRC idle mode comprises an RRC Connection Release message.

8. The method of claim I. wherein transitioning from the RRC connected mode to the RRC idle mode occurs at a time associated with when the base station starts to broadcast the updated system information.

9. The method of claim 1, wherein system information changes in the wireless telecommunications system are scheduled in accordance with a system information modification period, and wherein transitioning from the RRC connected mode to the RRC idle mode occurs at a time associated with a boundary of a system information modification period following the indication that updated system information is to be broadcast by the base station.

10. The method of claim 1, further comprising:
the terminal device storing a record to indicate its currently stored system information is no longer valid after it has received the indication of the updated system information and until it has acquired the updated system information.

11. The method of claim 1, further comprising:
determining the updated system information is not for a class of system information whose acquisition should not be delayed before transitioning from the connected mode to the idle mode to seek to acquire the updated system information.

12. The method of claim 1, further comprising:
the terminal device transitioning from the RRC idle mode to the RRC connected mode in response to acquiring the updated system information.

13. The method of claim 1, wherein the paging message comprising the indication that updated system information is to be broadcast by the base station is received on a paging channel of the wireless telecommunications system.

14. The method of claim 1, wherein the radio interface comprises a series of subframes and the physical resources corresponding to the restricted subset of transmission resources may be different for different subframes.

15. The method of claim 1, wherein the terminal device is a machine type communication (MTC) terminal device.

16. A terminal device for use in a wireless telecommunications system in which downlink communications are made by a base station using a radio interface that spans a system frequency bandwidth and the terminal device is configured to receive at least some communications from the base station within a restricted subset of transmission resources selected from within the system frequency bandwidth and comprising a downlink channel having a channel bandwidth which is smaller than the system frequency bandwidth, and wherein the wireless telecommunications system supports a Radio Resource Control (RRC) connected mode of operation in which the terminal device receives a type of user-plane data using the restricted subset of transmission resources and an RRC idle mode of operation in which terminal device does not receive the type of user-plane data, wherein the terminal device comprises:
a transceiver configured to receive from the base station a paging message comprising an indication that updated system information is to be broadcast by the base station while the terminal device is in the RRC connected mode and indicating transmission resources to be used to broadcast the updated system information; and
a controller configured to cause the terminal device to, responsive to the indication that the updated system information is to be broadcast by the base station, transition from the RRC connected mode to the RRC idle mode before seeking to acquire the updated system information and to seek to acquire the updated system information broadcast by the base station via the indicated transmission resources, while the terminal device is in the RRC idle mode.

17. A base station for use in a wireless telecommunications system in which downlink communications are made by the base station using a radio interface that spans a system frequency bandwidth and the base station is configured to transmit at least some communications to at least one terminal device within a restricted subset of transmission resources selected from within the system frequency bandwidth and comprising a downlink channel having a channel bandwidth which is smaller than the system frequency bandwidth, and wherein the wireless telecommunications system supports the terminal device in a connected mode of operation in which the base station transmits a type of user-plane data to the terminal device using the restricted subset of transmission resources and an idle mode of operation in which the base station does not transmit the type of user-plane data to the terminal device, wherein the base station comprises:
a transceiver configured to transmit an indication that updated system information is to be broadcast by the base station while the terminal device is in the connected mode and
a controller configured to restrict the scheduling of user-plane data transmissions for the terminal device from a time associated with the broadcast of the updated system information until after the terminal device re-enters the connected mode after having transitioned to the idle mode following the transmission of the indication that updated system information is to be broadcast.

* * * * *